(12) United States Patent
Takeyasu et al.

(10) Patent No.: US 12,230,133 B2
(45) Date of Patent: Feb. 18, 2025

(54) TRAFFIC MANAGEMENT APPARATUS, TRAFFIC MANAGEMENT METHOD, AND COMPUTER READABLE MEDIUM

(71) Applicant: Mitsubishi Electric Corporation, Tokyo (JP)

(72) Inventors: Masaaki Takeyasu, Tokyo (JP); Mari Ochiai, Tokyo (JP); Shusaku Umeda, Tokyo (JP); Takeshi Suehiro, Tokyo (JP); Takashi Asahara, Tokyo (JP); Teruko Fujii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 140 days.

(21) Appl. No.: 18/208,942

(22) Filed: Jun. 13, 2023

(65) Prior Publication Data

US 2023/0326340 A1 Oct. 12, 2023

Related U.S. Application Data

(63) Continuation of application No. PCT/JP2021/005508, filed on Feb. 15, 2021.

(51) Int. Cl.
*G01C 21/30* (2006.01)
*G01C 21/00* (2006.01)
*G08G 1/0969* (2006.01)

(52) U.S. Cl.
CPC ....... *G08G 1/0969* (2013.01); *G01C 21/3815* (2020.08)

(58) Field of Classification Search
CPC ........................ G08G 1/0969; G01C 21/3815
See application file for complete search history.

(56) References Cited

U.S. PATENT DOCUMENTS

| | | | |
|---|---|---|---|
| 9,827,683 | B1 | 11/2017 | Hance et al. |
| 2009/0279499 | A1 | 11/2009 | Machida |
| 2018/0043547 | A1 | 2/2018 | Hance et al. |
| 2018/0306587 | A1 | 10/2018 | Holz |
| 2018/0370046 | A1 | 12/2018 | Hance et al. |

(Continued)

FOREIGN PATENT DOCUMENTS

| | | |
|---|---|---|
| JP | 8-115495 A | 5/1996 |
| JP | 2002-230693 A | 8/2002 |

(Continued)

OTHER PUBLICATIONS

International Search Report (PCT/ISA/210) issued in PCT/JP2021/005508 mailed on Apr. 27, 2021.

(Continued)

*Primary Examiner* — Mathew Franklin Gordon
(74) *Attorney, Agent, or Firm* — Birch, Stewart, Kolasch & Birch, LLP

(57) ABSTRACT

A virtual map generation unit (112) generates a virtual map of a subjected area by dividing the subjected area into role areas each of which corresponds to each of a plurality of roles, based on the number of vehicles scheduled to travel in the subjected area specified from work plan information on a transportation work of loads by a vehicle and based on the number of loads scheduled to be placed in the subjected area specified from the work plan information. A distribution unit (115) distributes to the vehicle traveling in the subjected area, the virtual map generated by the virtual map generation unit (112).

13 Claims, 20 Drawing Sheets

(56) References Cited

U.S. PATENT DOCUMENTS

| | | |
|---|---|---|
| 2019/0187699 A1 | 6/2019 | Salour et al. |
| 2019/0310626 A1 | 10/2019 | Salour et al. |

FOREIGN PATENT DOCUMENTS

| | | |
|---|---|---|
| JP | 2002-230694 A | 8/2002 |
| JP | 2003-168199 A | 6/2003 |
| JP | 2004-94671 A | 3/2004 |
| JP | 2007-285733 A | 11/2007 |
| JP | 2009-15684 A | 1/2009 |
| JP | 2009-267963 A | 11/2009 |
| JP | 2009-272883 A | 11/2009 |
| JP | 2010-61335 A | 3/2010 |
| JP | 2010-103945 A | 5/2010 |
| JP | 2017-4177 A | 1/2017 |
| JP | 2017-67727 A | 4/2017 |
| JP | 2017-156704 A | 9/2017 |
| JP | 2019-109879 A | 7/2019 |
| JP | 2019-529277 A | 10/2019 |
| JP | 2020-519987 A | 7/2020 |

OTHER PUBLICATIONS

Japanese Notification of Reason for Refusal dated Oct. 12, 2021 in Japanese Patent Application No. 2021-534279.

| COMMUNICATION AREA | TIME SLOT | ROLE | COMMUNICATION QUALITY |
|---|---|---|---|
| AREA A | 0:00 TO 6:00 | UNUSED | 1 |
| | 6:00 TO 7:00 | AREA CREATION | 2 |
| | 7:00 TO 10:00 | STANDBY AREA | 3 |
| | ⋮ | ⋮ | ⋮ |
| AREA B | 0:00 TO 6:00 | UNUSED | 1 |
| | 6:00 TO 7:00 | AREA CREATION | 2 |
| | 7:00 TO 10:00 | TRAVEL AREA | 4 |
| | ⋮ | ⋮ | ⋮ |

Fig. 12

| COMMUNICATION QUALITY | DATA RATE (UL) [Mbps: Mega bit per second] | DATA RATE (DL) [Mbps: Mega bit per second] | DELAY TIME [millisecond] |
|---|---|---|---|
| 1 | 0.25 | 0.25 | 100 |
| 2 | 50 | 0.25 | 100 |
| 3 | 10 | 10 | 100 |
| 4 | 50 | 25 | 10 |
| ... | ... | ... | ... |

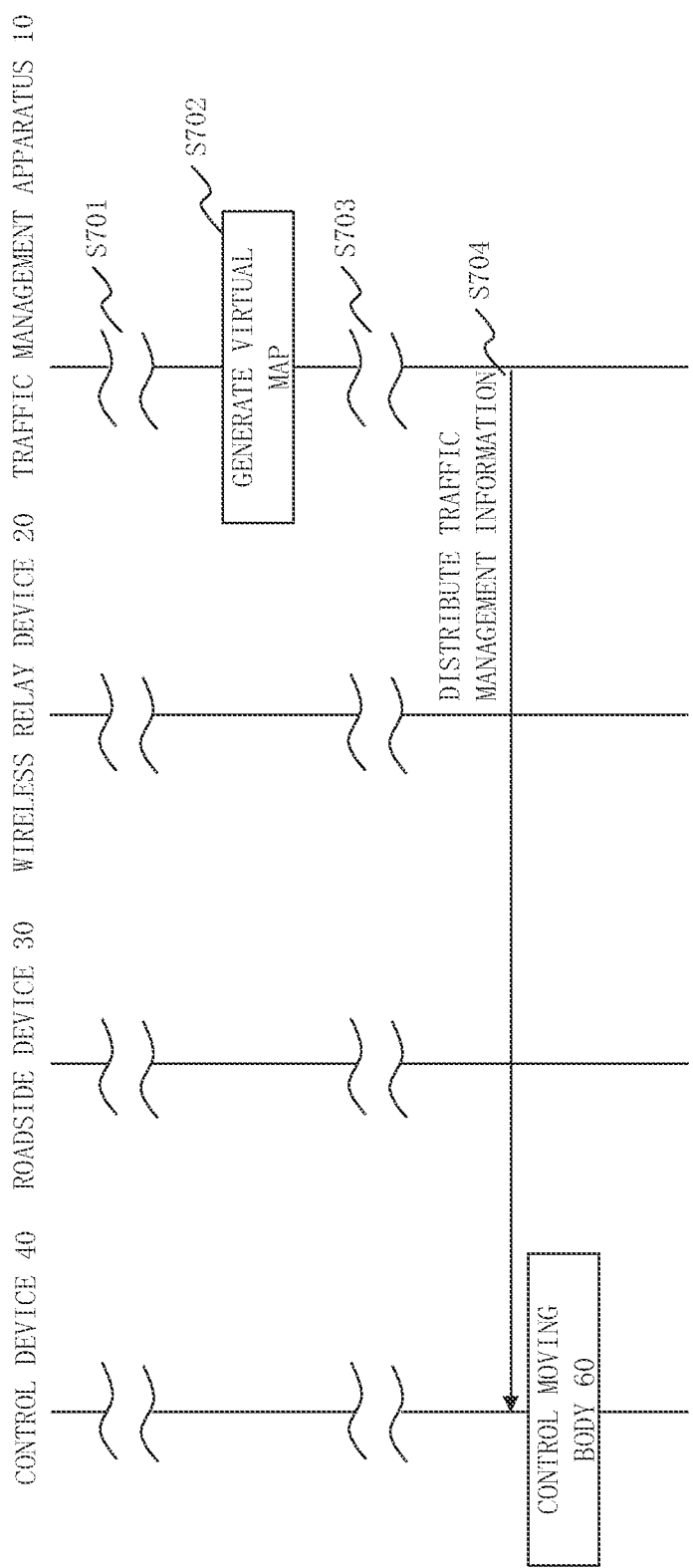

TRAFFIC MANAGEMENT APPARATUS, TRAFFIC MANAGEMENT METHOD, AND COMPUTER READABLE MEDIUM

CROSS REFERENCE TO RELATED APPLICATION

This application is a Continuation of PCT International Application No. PCT/JP2021/005508, filed on Feb. 15, 2021, which is hereby expressly incorporated by reference into the present application.

TECHNICAL FIELD

The present disclosure relates to a technology to assist travel of a vehicle.

BACKGROUND ART

The development of the autonomous driving technology has been accelerating. Autonomous vehicles have been promoted to spread, so that efforts have been made to reduce traffic accidents, to relieve congestion of traffic, to improve efficiency of distribution, to assist elderly or the like in moving around, and the like.

As one of ways to use the autonomous vehicles, unmanned autonomous driving service in a limited area has been considered. Regarding unmanned autonomous driving transportation service, a remote autonomous driving system by remote monitoring or remote operation has been considered to be used in the limited area such as a distribution yard, a port, or a factory.

In an area such as a distribution yard, there are few road markings such as white lines, few indicators necessary for autonomous driving such as road signs, and few indicators for controlling traffic flows of a plurality of moving bodies such as traffic lights. Therefore, in the area such as a distribution yard, situations might occur such as a situation where a travel path of each vehicle overlaps with each other and a situation where vehicles are congested in a load placing space. In such an environment where vehicles are congested, an insufficiency of wireless resources is likely to occur, which affects transmission of communication data in the remote autonomous driving system.

Therefore, it is required to improve traffic management and wireless resource management in an area where clear traffic rules are not indicated.

Patent Literature 1 describes a communication system for solving the insufficiency of wireless resources and performing stable wireless communication necessary for assisting safety driving and smoothing traffic. In the communication system described in Patent Literature 1, priority data indicating transmission priority of each of a plurality of types of information to be transmitted, is stored, and information with high transmission priority to be transmitted depending on traffic volume or communication traffic is selected based on the priority data and the selected information is transmitted. As a result, it is intended to solve the insufficiency of wireless resources due to an increase in the traffic volume.

CITATION LIST

Patent Literature

Patent Literature 1: JP 2009-267963 A

SUMMARY OF INVENTION

Technical Problem

In the communication system described in Patent Literature 1, it is intended to solve the insufficiency of wireless resources by transmitting only information with high transmission priority depending on traffic volume or communication traffic volume. However, it is not possible to prevent congestion itself of vehicles that causes the insufficiency of wireless resources. As a result, when information with high transmission priority is frequently made, the insufficiency of wireless resources occurs.

The present disclosure aims, in an area where traffic indicators are few, to make it possible to efficiently use the area and to improve safety of travelling.

Solution to Problem

A traffic management apparatus according to the present disclosure includes:
  a virtual map generation unit to generate a virtual map of a subjected area by dividing the subjected area into role areas each of which corresponds to each of a plurality of roles, based on the number of moving bodies scheduled to travel in the subjected area specified from work plan information on a transportation work of loads by the moving body and based on the number of loads scheduled to be placed in the subjected area specified from the work plan information; and
  a distribution unit to distribute to the moving body, the virtual map generated by the virtual map generation unit.

Advantageous Effects of Invention

In the present disclosure, a subjected area is divided into role areas each of which corresponds to each of a plurality of roles and a virtual map of the subjected area is generated. Then, the virtual map is distributed to a vehicle. The vehicle travels according to the virtual map, so that even in an area where there are few traffic indicators, the area is efficiently used and safety of travelling is improved. As a result, it is possible to prevent vehicles from being congested or the like, which leads to a solution to the insufficiency of wireless resources.

BRIEF DESCRIPTION OF DRAWINGS

FIG. 11 is an explanatory diagram of a communication quality table 134 according to Embodiment 1.

FIG. 12 is an explanatory diagram of communication quality according to Embodiment 1.

FIG. 20 is a processing flow diagram illustrating the operation of the traffic management system 100 according to Embodiment 5.

DESCRIPTION OF EMBODIMENTS

Embodiment 1

*Description of Configuration*

Figure 1:
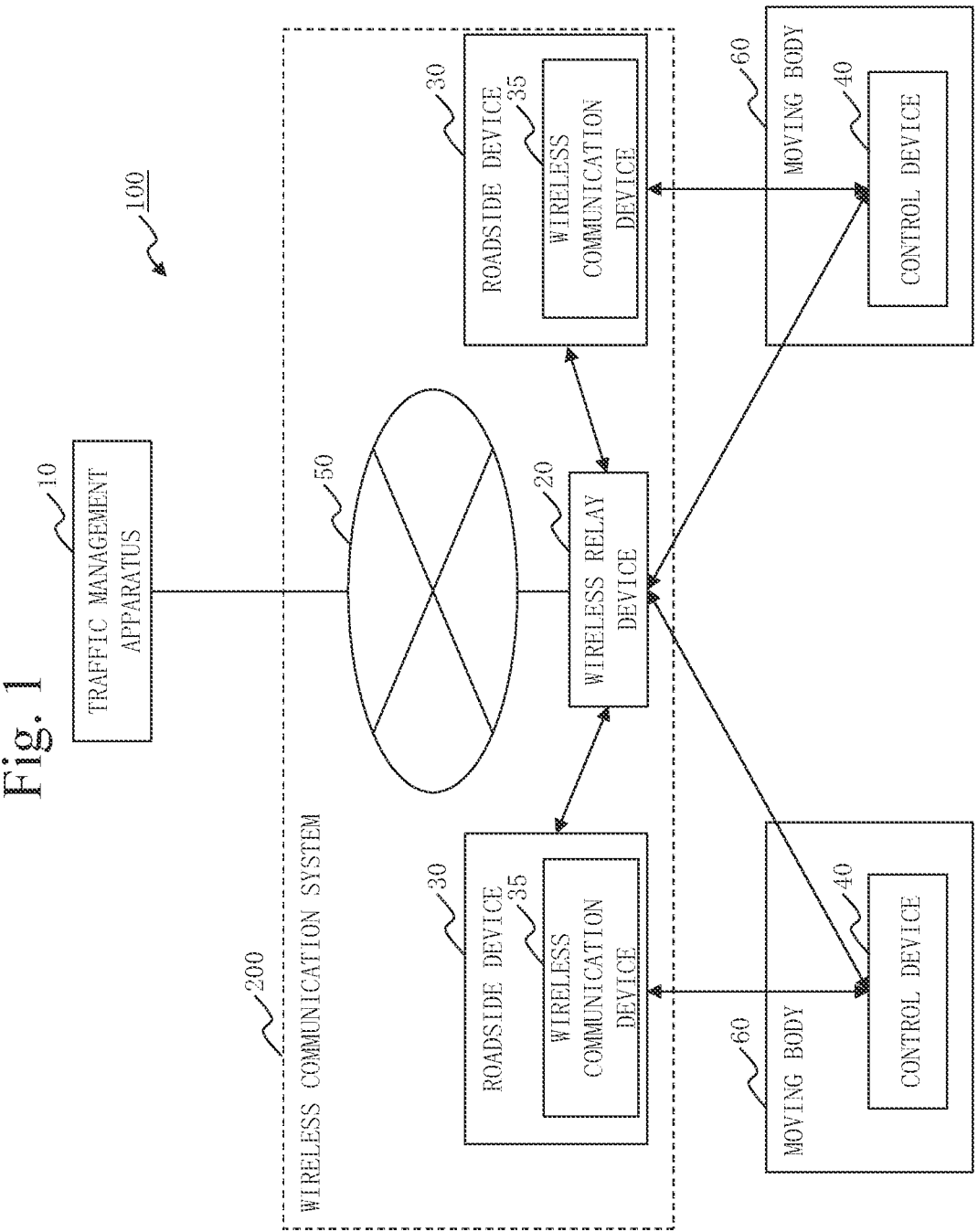
FIG. 1 is a configuration diagram of a traffic management system 100 according to Embodiment 1.

A configuration of a traffic management system 100 according to Embodiment 1 will be described with referring to FIG. 1.

A traffic management system 100 is a system that performs traffic management in a limited subjected area such as a distribution yard, a factory, a port, or a parking lot. The traffic management system 100 includes a traffic management apparatus 10, a wireless relay device 20, one or more roadside devices 30, and one or more control devices 40. The wireless relay device 20 and one or more roadside devices 30 are referred to as a wireless communication system 200.

The traffic management apparatus 10 and the wireless relay device 20 are connected to a communication network 50. The roadside device 30 is connected to the wireless relay device 20 via a transmission path. The control device 40 is connected to the wireless relay device 20 via one of the roadside devices 30. The control device 40 may be directly connected to the wireless relay device 20 via a transmission path. As a result, the traffic management apparatus 10, the roadside device 30, and the control device 40 are able to transmit/receive information with each other.

The traffic management apparatus 10 is a computer that performs traffic management in the subjected area and adjusts communication quality with the wireless communication system 200.

The wireless relay device 20 is a computer for connecting the control device 40 to the communication network 50. A specific example of the wireless relay device 20 is a computer that constitutes a base station in the wireless communication system 200.

The roadside device 30 is a sensor system placed on a roadside. The roadside device 30 is equipped with a camera and a sensor such as Light Detection and Ranging (LiDAR). The roadside device 30 incudes a wireless communication device 35 and is able to wirelessly communicate with the control device 40 within a communication area of the wireless communication device 35.

The control device 40 is a computer that controls a moving body 60 based on information provided by the traffic management apparatus 10. The control device 40 is installed in the moving body 60. In Embodiment 1, the moving body 60 is a vehicle such as a truck or an unmanned carrier vehicle that travels through the subjected area. The moving body 60 is equipped with a camera and sensors such as LiDAR, a vehicle speed sensor, and a steering angle sensor.

The communication network 50 is a wireless network such as a moving body communication network. The communication network 50 is, for example, a 3rd Generation (3G) network, a Long Term Evolution (LTE) network, a 5th Generation (5G) network, or a 6th Generation (6G) network. Further, the communication network 50 may include networks such as a wireless Local Area Network (LAN) and a wireless Metropolitan Area Network (MAN).

A configuration of the traffic management apparatus 10 according to Embodiment 1 will be described with referring to FIG. 2.

The traffic management apparatus 10 includes pieces of hardware of a processor 11, a memory 12, a storage 13, and a communication interface 14. The processor 11 is connected with other pieces of hardware via a signal line and controls the other pieces of hardware.

The traffic management apparatus 10 includes an information acquisition unit 111, a virtual map generation unit 112, a communication quality decision unit 113, a communication control unit 114, and the distribution unit 115, as functional components. Functions of the individual functional components of the traffic management apparatus 10 are implemented by software.

A program that implements the functions of the individual functional components of the traffic management apparatus 10 is stored in the storage 13. This program is read into the memory 12 by the processor 11 and run by the processor 11. Hence, the functions of the individual functional components of the traffic management apparatus 10 are implemented.

The storage 13 stores area map information 131, communication area information 132, work plan information 133, and a communication quality table 134.

Figure 3:
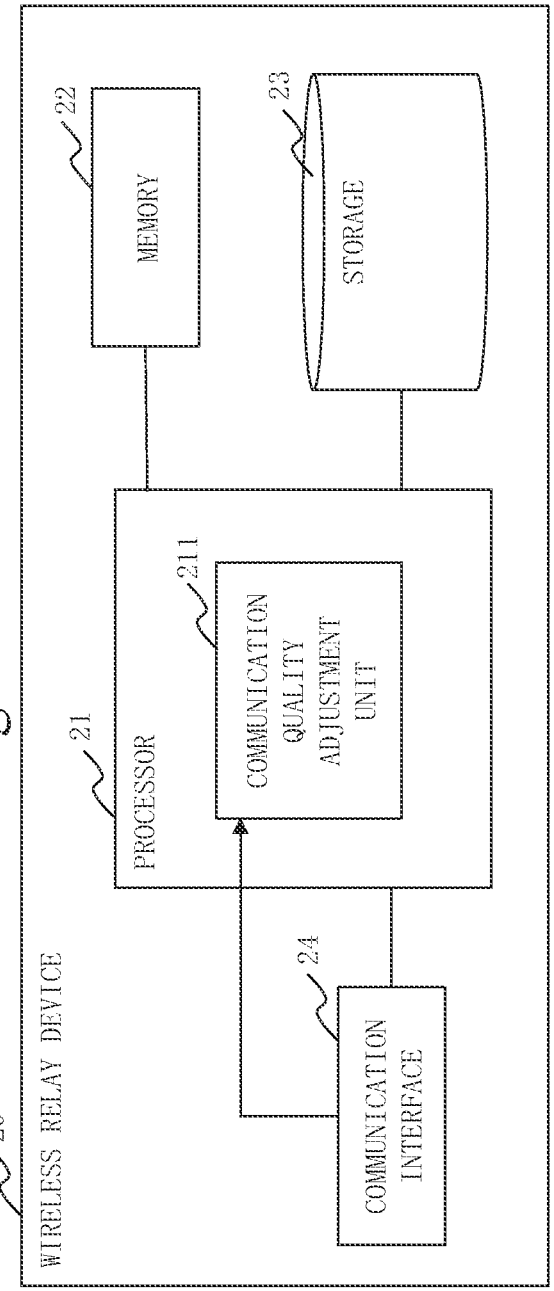
FIG. 3 is a configuration diagram of a wireless relay device 20 according to Embodiment 1.

A configuration of the wireless relay device 20 according to Embodiment 1 will be described with referring to FIG. 3.

The wireless relay device 20 includes pieces of hardware of a processor 21, a memory 22, a storage 23, and a communication interface 24. The processor 21 is connected with other pieces of hardware via a signal line and controls the other pieces of hardware.

The wireless relay device 20 includes a communication quality adjustment unit 211, as a functional component. A function of the individual functional component of the wireless relay device 20 is implemented by software.

A program that implements the function of the individual functional component of the wireless relay device 20 is stored in the storage 23. This program is read into the memory 22 by the processor 21 and run by the processor 21. Hence, the function of the individual functional component of the wireless relay device 20 is implemented.

A configuration of the roadside device 30 according to Embodiment 1 will be described with referring to FIG. 4.

The roadside device 30 includes pieces of hardware of a processor 31, a memory 32, a storage 33, a communication interface 34, and the wireless communication device 35. The processor 31 is connected with other pieces of hardware via a signal line and controls the other pieces of hardware.

The roadside device 30 includes an information collection unit 311, an information transmission unit 312, a distribution information acquisition unit 313, and a distribution information transmission unit 314, as functional components. Functions of the individual functional components of the roadside device 30 are implemented by software.

A program that implements the functions of the individual functional components of the roadside device 30 is stored in the storage 33. This program is read into the memory 32 by the processor 31 and run by the processor 31. Hence, the functions of the individual functional components of the roadside device 30 are implemented.

Figure 5:
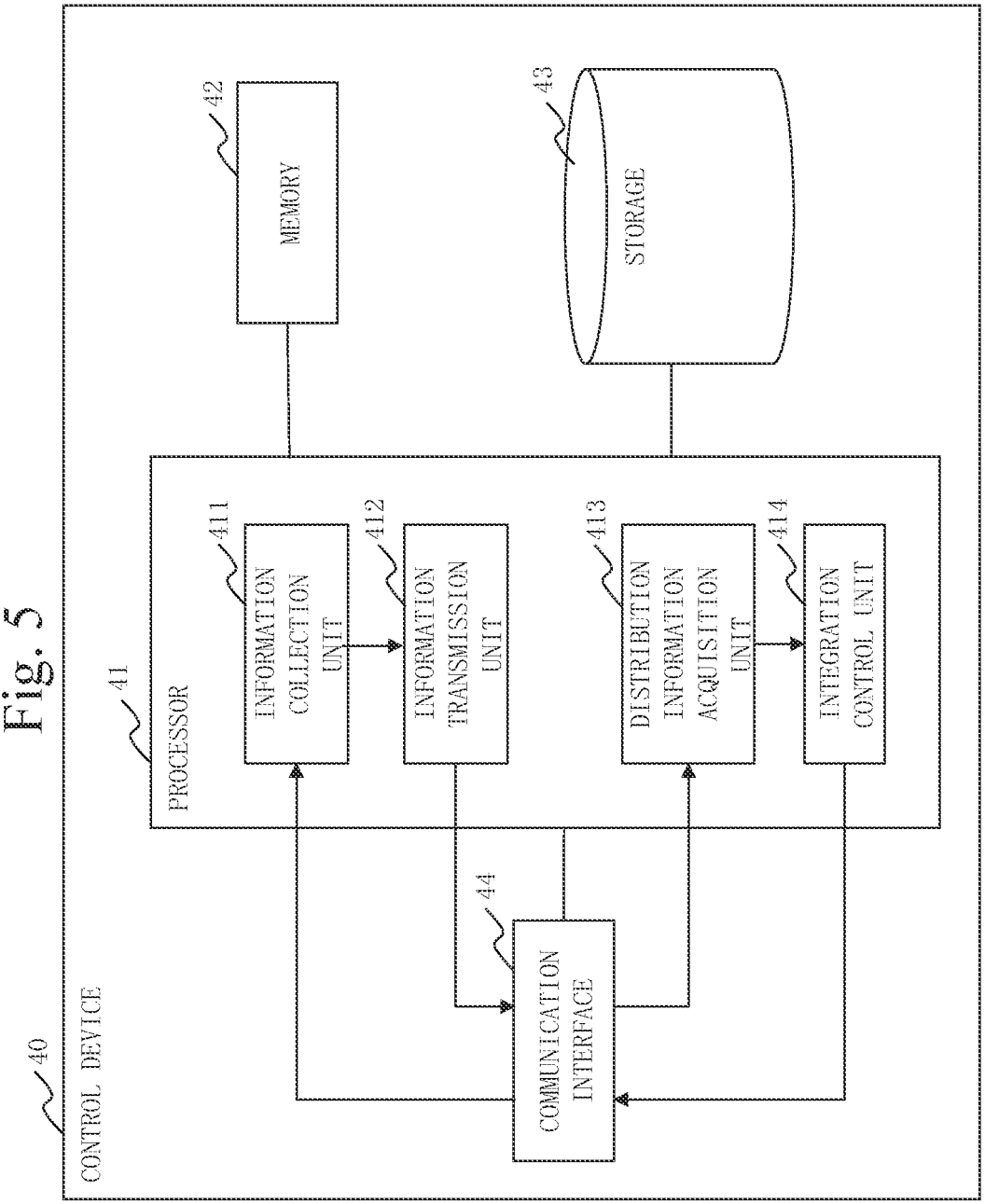
FIG. 5 is a configuration diagram of a control device 40 according to Embodiment 1.

A configuration of the control device 40 according to Embodiment 1 will be described with referring to FIG. 5.

The control device 40 includes pieces of hardware of a processor 41, a memory 42, a storage 43, and a communication interface 44. The processor 41 is connected with other pieces of hardware via a signal line and controls the other pieces of hardware.

The control device 40 includes an information collection unit 411, an information transmission unit 412, a distribution information acquisition unit 413, and an integration control unit 414, as functional components. Functions of the individual functional components of the control device 40 are implemented by software.

A program that implements the functions of the individual functional components of the control device 40 is stored in the storage 43. This program is read into the memory 42 by the processor 41 and run by the processor 41. Hence, the functions of the individual functional components of the control device 40 are implemented.

Each of the processors 11, 21, 31, and 41 is an Integrated Circuit (IC) that performs processing. Specific examples of the processors 11, 21, 31, and 41 are a Central Processing Unit (CPU), a Digital Signal Processor (DSP), and a Graphics Processing Unit (GPU).

Each of the memories 12, 22, 32, and 42 is a storage device that stores data temporarily. Specific examples of the memories 12, 22, 32, and 42 are a Static Random Access Memory (SRAM), and a Dynamic Random Access Memory (DRAM).

Each of the storages 13, 23, 33, and 43 is a storage device that stores data. A specific example of the storages 13, 23, 33, and 43 is a Hard Disk Drive (HDD). Further, each of the storages 13, 23, 33, and 43 may be a portable recording medium such as a Secure Digital (SD, registered trademark) memory card, a CompactFlash (CF, registered trademark), a NAND flash, a flexible disk, an optical disc, a compact disc, a Blu-ray (registered trademark) disc, or a Digital Versatile Disk (DVD).

Each of the communication interfaces 14, 24, 34, and 44 is an interface for communicating with an external device. Specific examples of the communication interfaces 14, 24, 34, and 44 are an Ethernet (registered trademark) port, a Universal Serial Bus (USB) port, and a High-Definition Multimedia Interface (HDMI, registered trademark) port.

FIG. 1 illustrates only one processor as the processor 11. However, there may be a plurality of processors 11. The plurality of processors 11 may corporate with each other to run the program that implements the individual functions. Similarly, there may be a plurality of processors 21, 31, and 41. The plurality of processors 21, 31, and 41 may corporate with each other to run the program that implements the individual functions.

*Description of Operation*

Operation of the traffic management apparatus 10 according to Embodiment 1 will be described with referring to FIGS. 6 through 12. An operation procedure of the traffic management apparatus 10 in the traffic management system 100 according to Embodiment 1 is equivalent to a traffic management method according to Embodiment 1. Further, a program that implements the operation of the traffic management apparatus 10 in the traffic management system 100 according to Embodiment 1 is equivalent to a traffic management program according to Embodiment 1.

In Embodiment 1, as an example, a case will be described where a transportation work of loads is carried out at a port or the like. Therefore, in Embodiment 1, the subjected area is an area such as a port where the transportation work of loads is carried out.

An overall processing flow of the traffic management system 100 according to Embodiment 1 will be described with referring to FIG. 6.

(Step S101: Communication Resource Allocation Process)

The communication quality decision unit 113 and the communication control unit 114 of the traffic management apparatus 10 perform initial allocation of a communication resource with the wireless relay device 20. Details of a communication resource allocation process will be described below.

(Step S102: Surroundings Information Transmission Process)

The information collection unit 311 of the roadside device 30 collects sensor information acquired by sensing surroundings with using an installed sensor. The information transmission unit 312 transmits the sensor information to the traffic management apparatus 10.

The information collection unit 411 of the control device 40 collects sensor information acquired by sensing surroundings with using a camera and a sensor such as LiDAR installed in the moving body 60. Further, the information collection unit 411 acquires sensor information indicating a state of the moving body 60 of a vehicle such as a vehicle speed, a steering angle, and an acceleration speed of the moving body 60, with using sensors such as a vehicle speed sensor and a steering angle sensor installed in the moving body 60. The information transmission unit 412 transmits the sensor information to the traffic management apparatus 10.

(Step S103: Information Acquisition Process)

The information acquisition unit 111 of the traffic management apparatus 10 acquires the sensor information transmitted by the roadside device 30 and the control device 40. Further, the information acquisition unit 111 acquires from an external server that provides weather forecast service, weather information on the subjected area.

The information acquisition unit 111 analyzes the sensor information and the weather information to specify types and positions of objects such as the moving bodies 60 and loads in the subjected area, and to specify a road surface condition at each point in the subjected area. The types of the objects are a vehicle which is the moving body 60, a container, a pedestrian, and obstacles such as an animal and a falling object. The types of the vehicle which is the moving body 60, are a truck, an unmanned carrier vehicle, and the like. As the road surface condition, there are conditions such as a dry condition and a wet condition. The positions can be specified by point cloud information or the like acquired by a sensor such as LiDAR.

A known method may be used to specify from the sensor information such as image data, the types of the objects and the condition of a road.

(Step S104: Virtual Map Generation Process)

The virtual map generation unit 112 of the traffic management apparatus 10 generates a virtual map of the subjected area by dividing based on the work plan information 133 stored in the storage 13, the subjected area into role areas each of which corresponds to each of a plurality of roles. The work plan information 133 indicates a plan regarding the transportation work of loads by the moving body 60. By referring to the work plan information 133, the virtual map generation unit 112 is able to specify types and the number of moving bodies 60 scheduled to travel in the subjected area at each time point and to specify types and the number of loads scheduled to be placed in the subjected area at each time pint. The role is the use of the area such as the use for loads to be placed, the use for the moving body 60 or the like to stand by, or the use for the moving body 60 to travel.

At this time, the virtual map generation unit 112 generates the virtual map in consideration of the types and the positions of the objects such as the moving bodies 60 and the loads in the subjected area specified in step S103. That is, the virtual map generation unit 112 generates the virtual map in consideration of the number of moving bodies 60 actually travelling in the subjected area, the number of loads and the positions of the loads that have been already placed in the subjected area, and the like. Further, the virtual map generation unit 112 generates the virtual map in consideration of the road surface condition at each point specified in step S103.

Figure 7:
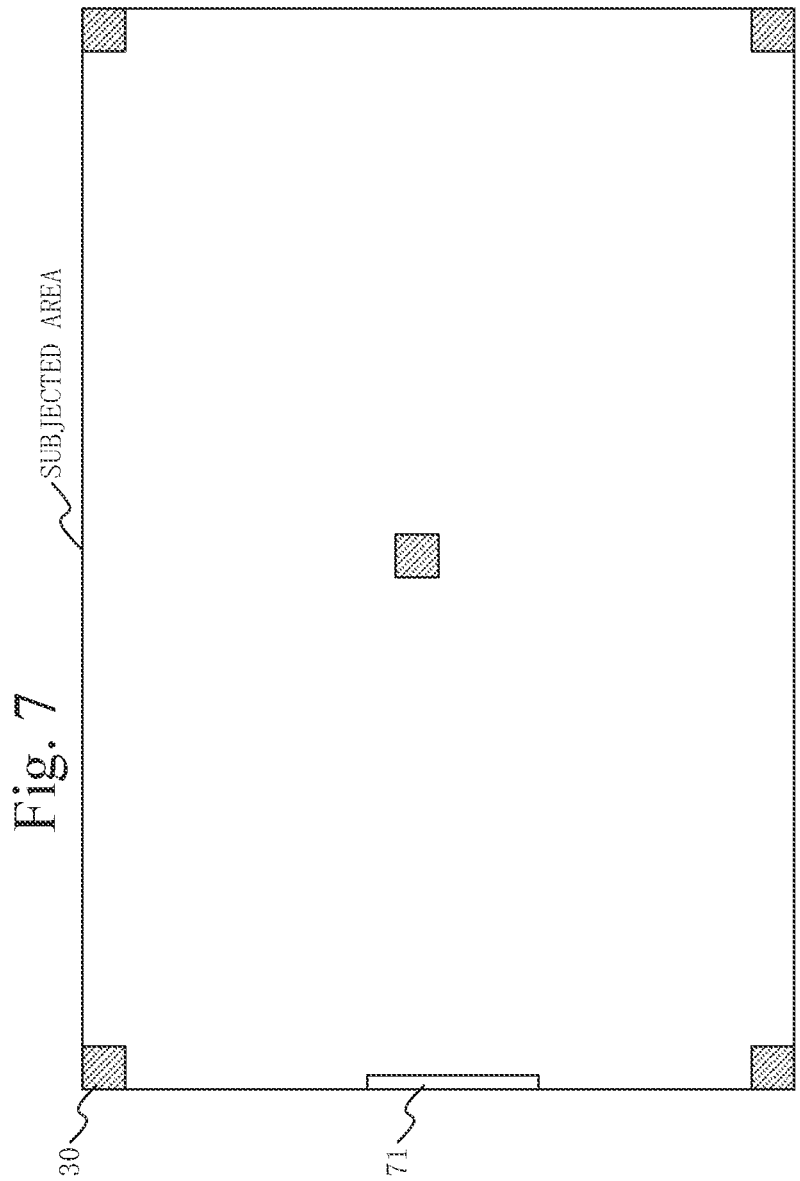
FIG. 7 is a diagram illustrating a map of a subjected area according to Embodiment 1.
Figure 8:
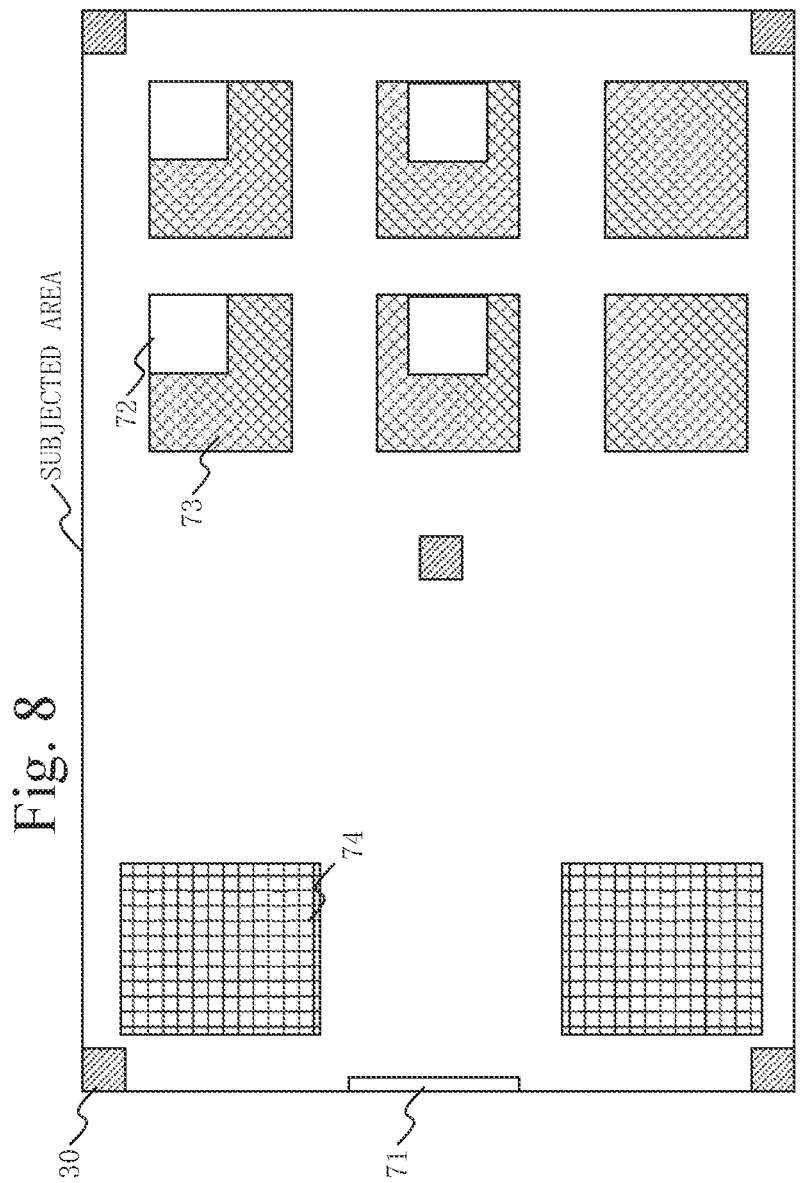
FIG. 8 is a diagram illustrating a state where a load area 73 and a standby area 74 are superimposed on the subjected area according to Embodiment 1.
Figure 9:
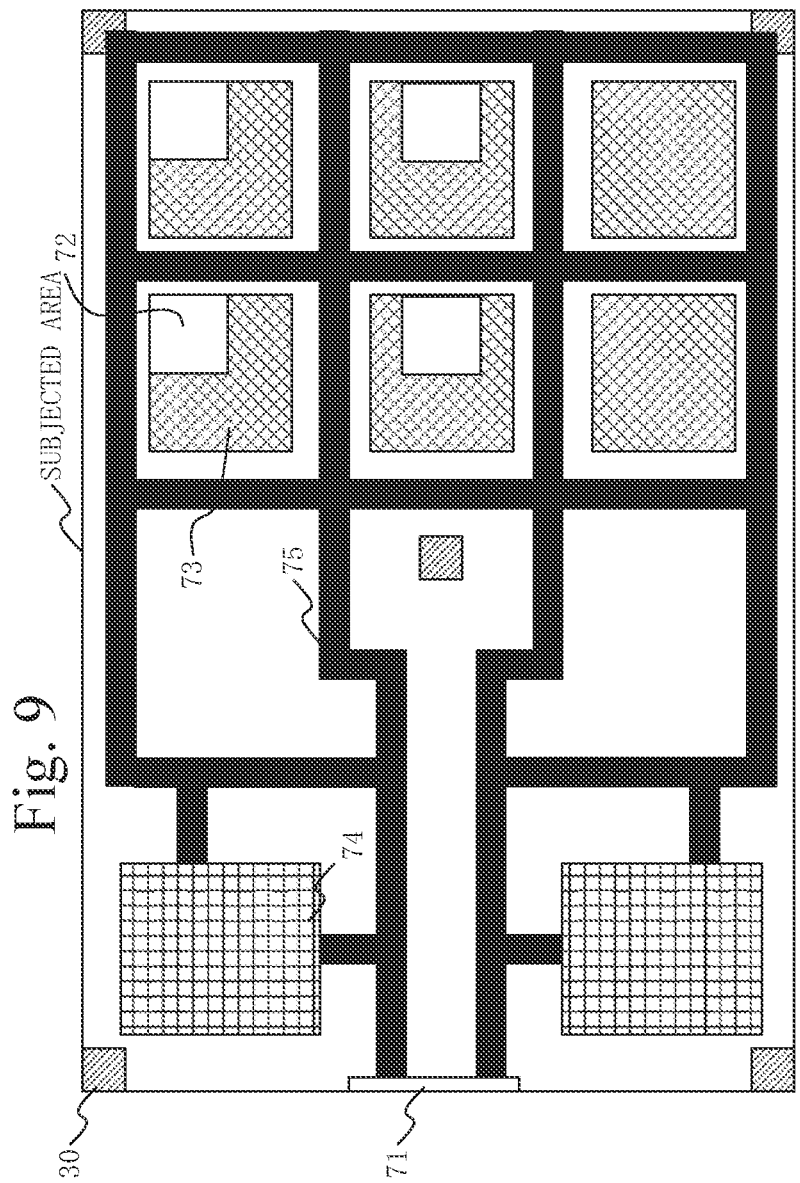
FIG. 9 is a diagram illustrating a state where the load area 73, the standby area 74, and a travel area 75 are superimposed on the subjected area according to Embodiment 1.

A specific description will be given with referring to FIGS. 7 through 9. In FIGS. 7 through 9, parts with the same hatching indicate the same parts.

The virtual map generation unit 112 reads the area map information 131 stored in the storage 13. As illustrated in FIG. 7, the area map information 131 is map information indicating a map of the subjected area. In FIG. 7, the subjected area is in a situation of an open space except that there are the roadside device 30 and a gate 71 through which the moving body 60 passes. The gate 71 is a loading entrance and an unloading entrance.

As illustrated in FIG. 8, the virtual map generation unit 112 superimposes on the map indicated in the area map information 131, arrangement positions of loads 72 that have been already placed in the subjected area specified in step S103. The virtual map generation unit 112 decides an arrangement position of loads 72 as a load area 73, which is the role area for loads to be placed, and adds an area around the arrangement position of loads 72 to the load area 73, as a space to be used for the transportation work. The virtual map generation unit 112 decides a size of the space to be added, depending on the number of placed loads, and the like. Further, the virtual map generation unit 112 decides a position of the space to be added depending on a predetermined rule, for example, the position of the space to be added is at the side of the unloading entrance with respect to the position of the placed load.

Next, the virtual map generation unit 112 refers to the work plan information 133 to specify load information on loads to be brought into the subjected area and the number of each type of moving bodies 60 that travel in the subjected area. At the port, a load unloaded from a ship is transported by the moving body 60. The load information indicates information indicating a position, contents, weight, quantity, a transportation destination, and the like.

The virtual map generation unit 112 specifies from the load information, the load area 73 for loads to be placed, and specifies from the number of each type of moving bodies 60, a standby area 74 which is the role area for the moving body 60 or the like to stand by for loading or unloading. The virtual map generation unit 112 decides the load area 73 depending on a predetermined rule, for example, the size of the load area 73 is decided depending on the number of loads, the load area 73 is adjacent to an arrangement position which has been already arranged, or the size of one load area 73 is less than or equal to an upper limit. Further, the virtual map generation unit 112 decides the standby area 74 depending on a predetermined rule, for example, the size of the standby area 74 is decided depending on the number of each type of moving bodies 60 or the standby area 74 is near the loading entrance. The load area 73 and the standby area 74 are decided from areas other than the areas already set as the load areas 73 in the subjected area.

Then, as illustrated in FIG. 9, the virtual map generation unit 112 decides the remaining area in the subjected area, as a travel area 75 which is the role area for the moving body 60 to travel. The remaining area is an area other than the load area 73 and the standby area 74.

The virtual map generation unit 112 does not decide all the remaining area as the travel area 75, but as illustrated in FIG. 9, the virtual map generation unit 112 may connect the gate 71, each load area 73, and each standby area 74 and decide the travel area 75 by setting passages that are wide enough for the moving bodies 60 to pass each other. For example, the virtual map generation unit 112 may determine candidate areas for the travel area 75 in advance and select from among the candidate areas, a candidate area that is not set as the load area 73 and the standby area 74, as the travel area 75. Further, the virtual map generation unit 112 may set the travel area 75 by simulating based on the work plan information 133, travel flows of the moving bodies 60 in the subjected area.

The virtual map generation unit 112 may enlarge ranges of the load area 73 and the standby area 74 depending on a weather condition and the road surface condition. For example, it is considered that the load area 73 is enlarged in bad weather such as rain or snow to reduce a risk of collision between a load and the moving body 60 travelling in the travel area 75.

(Step S105: Communication Quality Decision Process)

The communication quality decision unit 113 of the traffic management apparatus 10 decides for each communication area in the subjected area, based on the virtual map generated in step S104, the communication resource that can be used by a device in the communication area, depending on a ratio of each role area included in the communication area. Here, the devices are the roadside device 30 and the control device 40. The communication quality decision unit 113 writes the decided communication resource into the communication quality table 134. The communication quality table 134 will be described below.

Specifically, the communication quality decision unit 113 reads the communication area information 132 stored in the storage 13. The communication area information 132 indicates a communication area of the wireless communication device 35 included in each roadside device 30 in the subjected area. The communication quality decision unit 113 specifies the role area corresponding to the communication area of each roadside device 30 by superimposing the communication area of each roadside device 30 on the virtual map generated in step S103. For the communication area of each roadside device 30, the communication quality decision unit 113 decides the communication resource for the subjected communication area, based on the role of the role area corresponding to the subjected communication area. Deciding the communication resource for the subjected communication area means deciding the communication resource that can be used by the roadside device 30 corresponding to the subjected communication area and the control device 40 installed in the moving body 60 that is in the subjected communication area.

For example, it is assumed that many of role areas in the communication area are traveling areas. In this case, in order to prevent collision accidents between the moving bodies 60 and to ensure safe driving, it is required to transmit without delay or loss to the traffic management apparatus 10, the sensor information acquired by the roadside device 30. Further, the moving body 60 that transports loads needs real-time information distribution from the traffic management apparatus 10. Therefore, the communication quality decision unit 113 allocates the communication resource to increase data rates of an uplink and a downlink.

Further, for example, it is assumed that many of role areas in the communication areas are standby areas. In this case, when the moving body 60 is standing by in a standby area, it is not required to frequently exchange data with the traffic management apparatus 10. Therefore, the communication quality decision unit 113 allocates the communication resource whose data rate is low for both of the uplink and the downlink.

(Step S106: Change Request Process)

The communication control unit 114 of the traffic management apparatus 10 refers to the communication quality decided in step S105 to transmit a change request of a resource allocation to the wireless relay device 20. Then, the communication quality adjustment unit 211 of the wireless relay device 20 determines whether or not it is possible to allocate the communication resource requested by the change request.

When the allocation is possible, the communication quality adjustment unit 211 transmits to the traffic management apparatus 10, a change response indicating that the allocation is possible. Then, the communication control unit 114 of the traffic management apparatus 10 notifies the roadside device 30 and the control device 40 to which the resource allocation is changed, of changed resource information.

On the other hand, when the allocation is not possible, the communication quality adjustment unit 211 transmits to the traffic management apparatus 10, a change response indicating that the allocation is not possible. Then, the communication control unit 114 of the traffic management apparatus 10 redecides the communication resource and transmits the change request again to the wireless relay device 20. As a method of redeciding the communication resource, it is conceivable to slightly reduce the communication resource to be allocated to the communication area to which many communication resources have been allocated.

The communication control unit 114 converts the decided communication resource into information according to a communication method used in the communication network 50 and then transmits the converted communication resource which is included in the change request. For example, when the communication network 50 is Long Term Evolution (LTE), the decided communication resource is converted into a value of QoS Class Indicator (QCI) which is a communication quality value defined in 3rd Generation Partnership Project (3GPP) standards. Further, when the communication network 50 is a 5G network, the decided communication resource is converted into a value of 5G QoS Indicator (5QI).

(Step S107: Communication Method Notification Process)

The communication control unit 114 of the traffic management apparatus 10 decides a communication method with the roadside device 30 and the control device 40, depending on the communication resource for which the allocation has been decided in step S106. Then, the communication control unit 114 notifies the roadside device 30 and the control device 40 of the decided communication method.

The communication method is a transmission cycle of transmitting/receiving data between the roadside device 30 as well as the control device 40 and the traffic management apparatus 10, a resolution degree of information notified by the roadside device 30 and the control device 40, and a type of information distributed by the traffic management apparatus 10 to the roadside device 30 and the control device 40. The resolution degree of information is, for example, an image quality of data photographed by a camera. The types of information are, for example, traffic management information and route information.

When receiving a notification, the roadside device 30 and the control device 40 exchange data with the traffic management apparatus 10 based on the notified communication method.

(Step S108: Traffic Management Information Generation Process)

The virtual map generation unit 112 of the traffic management apparatus 10 generates the traffic management information from the virtual map generated in step S104. The traffic management information is information in which the moving body 60 actually travelling in the subjected area and a load that has been already placed in the subjected area are superimposed on the virtual map. That is, the traffic management information is information indicated on the virtual map, at a position where the moving body 60 is travelling and at a position where the load is placed.

(Step S109: Distribution Process)

The distribution unit 115 of the traffic management apparatus 10 distributes to the control device 40, the traffic management information generated in step S108 according to the communication method decided in step S107.

The distribution information acquisition unit 413 of the control device 40 acquires the traffic management information. Then, the integration control unit 414 of the control device 40 decides based on the traffic management information, a movement target of the moving body 60 at each time point, and controls the moving body 60 based on the sensor information collected by the sensors installed in the moving body 60, to move the moving body 60 to the movement target. At this time, the integration control unit 414 controls the moving body 60 to travel in the travel area indicated in the traffic management information.

When the distribution information acquisition unit 313 of the roadside device 30 acquires the traffic management information, the distribution information transmission unit 314 distributes the traffic management information to the control device 40 which is in the communication area of the wireless communication device 35.

After that, the processes are executed again from step S102.

The communication resource allocation process (step S101 of FIG. 6) according to Embodiment 1 will be described with referring to FIG. 10.

(Step S201: Communication Quality Decision Process)

The communication quality decision unit 113 of the traffic management apparatus 10 decides based on the work plan information 133, the communication resource for each communication area in the subjected area, at each time slot. Then, the communication quality decision unit 113 writes the decided communication resource into the communication quality table 134.

Specifically, the communication quality decision unit 113 specifies from the work plan information 133, a time point at which transportation of loads is started. The communication quality decision unit 113 determines that a time up to the time point at which the transportation of loads is started on a day, is a time at which each communication area in the subjected area is unused. Further, the communication quality decision unit 113 determines that a certain period of time from the time point at which the transportation of loads is started on the day, is a time for an area creation at which the virtual map is generated for each communication area in the subjected area.

Then, the communication quality decision unit 113 allocates the minimum communication resource to each communication area because it does not matter even if the communication quality is low during the unused time. During the time for the area creation, in order to generate the fundamental virtual map, it is required to transmit high resolution data from the roadside device 30 and the control device 40 to the traffic management apparatus 10, so that the communication quality decision unit 113 allocates the communication resource to each communication area to increase the data rate of the uplink.

(Step S202: Communication Start Process)

When starting communication, the information transmission unit 312 of the roadside device 30 and the information transmission unit 412 of the control device 40 transmit a connection request to the wireless relay device 20. Then, the communication quality adjustment unit 211 of the wireless relay device 20 transmits a connection response to the roadside device 30 and the control device 40 which are transmission sources of the connection request.

The information transmission unit 312 of the roadside device 30 and the information transmission unit 412 of the control device 40 transmit a communication start request to the traffic management apparatus 10. The communication quality decision unit 113 of the traffic management apparatus 10 refers to the communication quality table 134 to specify based on positions of the roadside device 30 and the control device 40, the communication resource to be allocated to the roadside device 30 and the control device 40, and transits to the wireless relay device 20, an allocation request of the communication resource. Then, the communication quality adjustment unit 211 of the wireless relay device 20 determines whether or not it is possible to allocate the communication resource requested by the allocation request.

When the allocation is possible, the communication quality adjustment unit 211 transmits to the traffic management apparatus 10, an allocation response indicating that the allocation is possible. Then, the communication control unit 114 of the traffic management apparatus 10 notifies the roadside device 30 and the control device 40 of the resource information to be allocated.

On the other hand, when the allocation is not possible, the communication quality adjustment unit 211 transmits to the traffic management apparatus 10, an allocation response indicating that the allocation is not possible. Then, the communication control unit 114 of the traffic management apparatus 10 redecides the communication resource and transmits the allocation request again to the wireless relay device 20.

(Step S203: Communication Method Notification Process)

The communication control unit 114 of the traffic management apparatus 10 decides the communication method with the roadside device 30 and the control device 40, depending on the communication resource for which the allocation has been decided in step S106. Specifically, the communication control unit 114 decides the communication method as in step S107 of FIG. 6. Then, the communication control unit 114 notifies the roadside device 30 and the control device 40 of the decided communication method.

When receiving a notification, the roadside device 30 and the control device 40 exchange data with the traffic management apparatus 10 based on the notified communication method.

The communication quality table 134 according to Embodiment 1 will be described with referring to FIGS. 11 and 12.

As illustrated in FIG. 11, the communication quality table 134 stores the communication quality indicating the role and the communication resource for each communication area and each time slot. As illustrated in FIG. 12, the communication quality indicates the data rate of the uplink, the data rate of the downlink, and a delay time.

Figure 10:
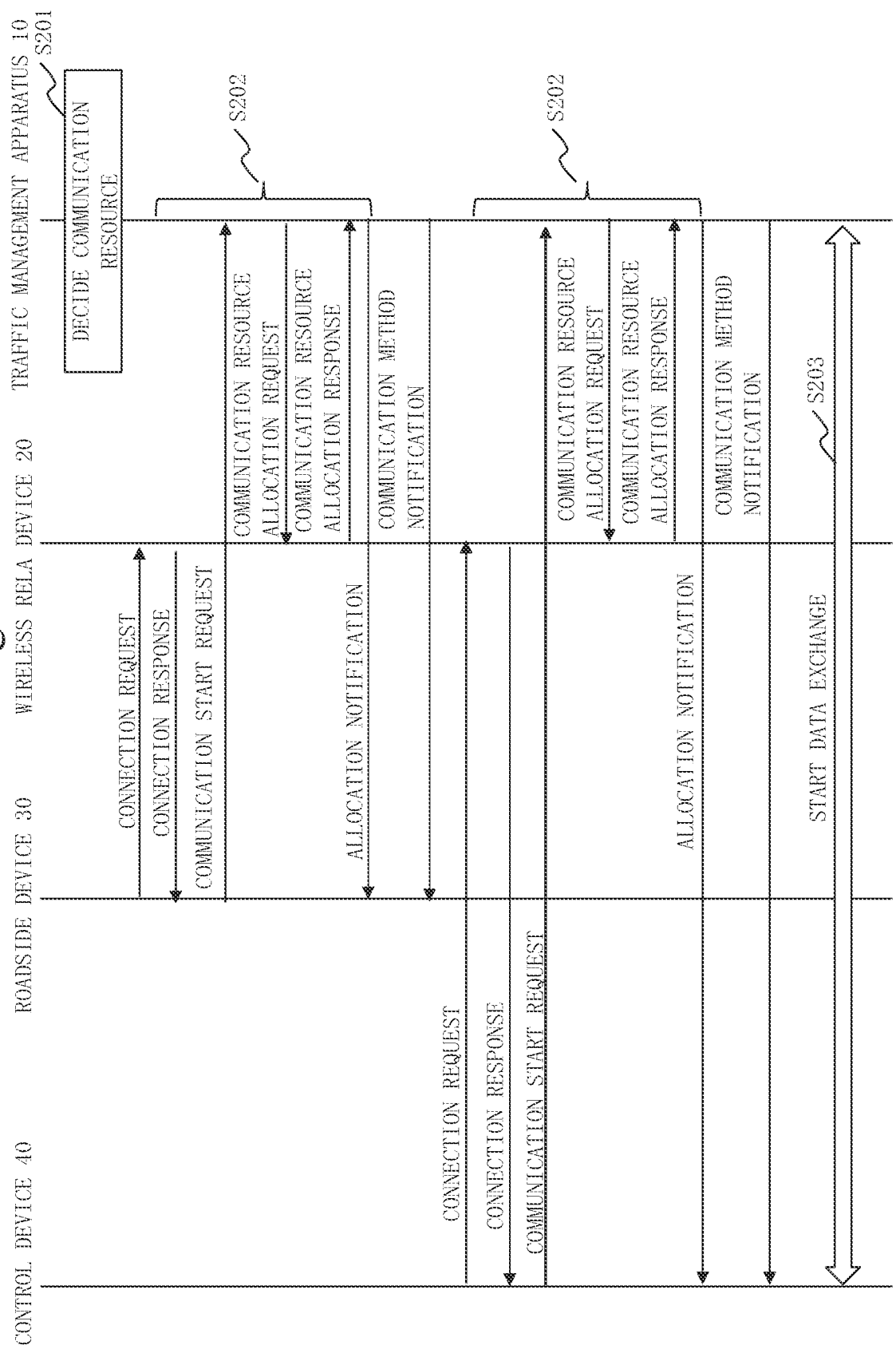
FIG. 10 is a processing flow diagram of a communication resource allocation process (step S101 of FIG. 6) according to Embodiment 1.

As described with referring to FIG. 10, first, the unused time and the area creation time are specified and then the allocation of the communication resource is decided for each time. After that, as described with referring to FIG. 6, the virtual map is generated and the communication resource to be allocated to each communication area is decided depending on the ratio of each role area included in each communication area. For example, in FIG. 11, for an area A which is the communication area, a most range is the standby area 74 after 7:00 and communication quality 3 is set. Further, for an area B which is the communication area, a most range is the travel area 75 after 7:00 and communication quality 4 is set. If it is the standby area 74, the number of moving bodies 60 to be communicated is less, so that the communication quality with the reduced data rate of the downlink is selected. On the other hand, in the travel area 75 where an Automatic Guided Vehicle (AGV) or the like travels, the communication quality with the shortened delay time is selected in order to improve movement accuracy of the AGV.

*Effect of Embodiment 1*

As described above, the traffic management apparatus 10 according to Embodiment 1 divides a subjected area into role areas each of which corresponds to each of a plurality of roles and generates a virtual map of the subjected area. Then, the virtual map is distributed to a vehicle. The vehicle travels according to the virtual map, so that even in an area where there are few traffic indicators, the area is efficiently used and safety of travelling is improved. As a result, it is possible to prevent vehicles from being congested or the like, which leads to a solution to the insufficiency of wireless resources.

Further, the traffic management apparatus 10 according to Embodiment 1 decides for a communication area of each roadside device 30, a communication resource that can be used by a device in the communication area, depending on a ratio of each role area included in the communication area. As a result, the necessary communication resource is allocated to each roadside device 30 and each control device 40, and it is possible to solve the insufficiency of wireless resources.

\*\*\*Other Configurations\*\*\*

<Modification 1>

In Embodiment 1, the sensor information is collected by the sensors and information on a load in the subjected area is collected. However, the control device 40 may collect the information on the load by wirelessly communicating with the load to which a Radio Frequency Identification (RFID) tag or the like is attached. For example, the control device 40 acquires an identification number from the load through wireless communication. By registering in advance, the information on the load for each identification number, it is possible to obtain the accurate information on the load, which is difficult to identify from its external appearance.

Alternatively, a marker (a figure or the like) that can uniquely identify the load may be displayed on the top of the load or the like and the control device 40 may specify the identification number of the load by reading the marker.

It is required to specify a position of the load from the sensor information on the image data or the like acquired through photographing.

<Modification 2>

In Embodiment 1, the individual functional components are implemented by software. However, as Modification 2, the individual functional components may be implemented by hardware. Regarding this Modification 2, points that differ from Embodiment 1 will be described.

When the individual functional components are implemented by hardware, the traffic management apparatus 10 includes an electronic circuit in place of the processor 11, the memory 12 and the storage 13. The electronic circuit is a dedicated circuit that implements the functions of the individual functional components, a function of the memory 12, and a function the storage 13.

Similarly, when the individual functional components are implemented by hardware, the wireless relay device 20 includes an electronic circuit in place of the processor 21, the memory 22, and the storage 23. The electronic circuit is a dedicated circuit that implements the functions of the individual functional components, a function of the memory 22, and a function of the storage 23.

Similarly, when the individual functional components are implemented by hardware, the roadside device 30 includes an electronic circuit in place of the processor 31, the memory 32, and the storage 33. The electronic circuit is a dedicated circuit that implements the functions of the individual functional components, a function of the memory 32, and a function of the storage 33.

Similarly, when the individual functional components are implemented by hardware, the control device 40 includes an electronic circuit in place of the processor 41, the memory 42, and the storage 43. The electronic circuit is a dedicated circuit that implements the functions of the individual functional components, a function of the memory 42, and a function of the storage 43.

The electronic circuit is assumed to be a single circuit, a composite circuit, a programed processor, a parallel-programmed processor, a logic IC, a Gate Array (GA), an Application Specific Integrated Circuit (ASIC), or a Field-Programmable Gate Array (FPGA).

The individual functional components may be implemented by one electronic circuit. The individual functional components may be decentralized into a plurality of electronic circuits and implemented by the plurality of electronic circuits.

<Modification 3>

Modification 3 may be possible in which some of the individual functional components are implemented by hardware and the remaining individual functional components are implemented by software.

The processor 11, the memory 12, the storage 13, and the electronic circuit are referred to as processing circuitry. That is, the functions of the individual functional components are implemented by the processing circuitry.

Embodiment 2

Embodiment 2 differs from Embodiment 1 in that the roadside device 30 aggregates the sensor information collected from the control devices 40 within the communication area and then transmits the aggregated sensor information to the traffic management apparatus 10. In Embodiment 2, this difference will be described and a description of the same point will be omitted.

\*\*\*Description of Configuration\*\*\*

Figure 13:
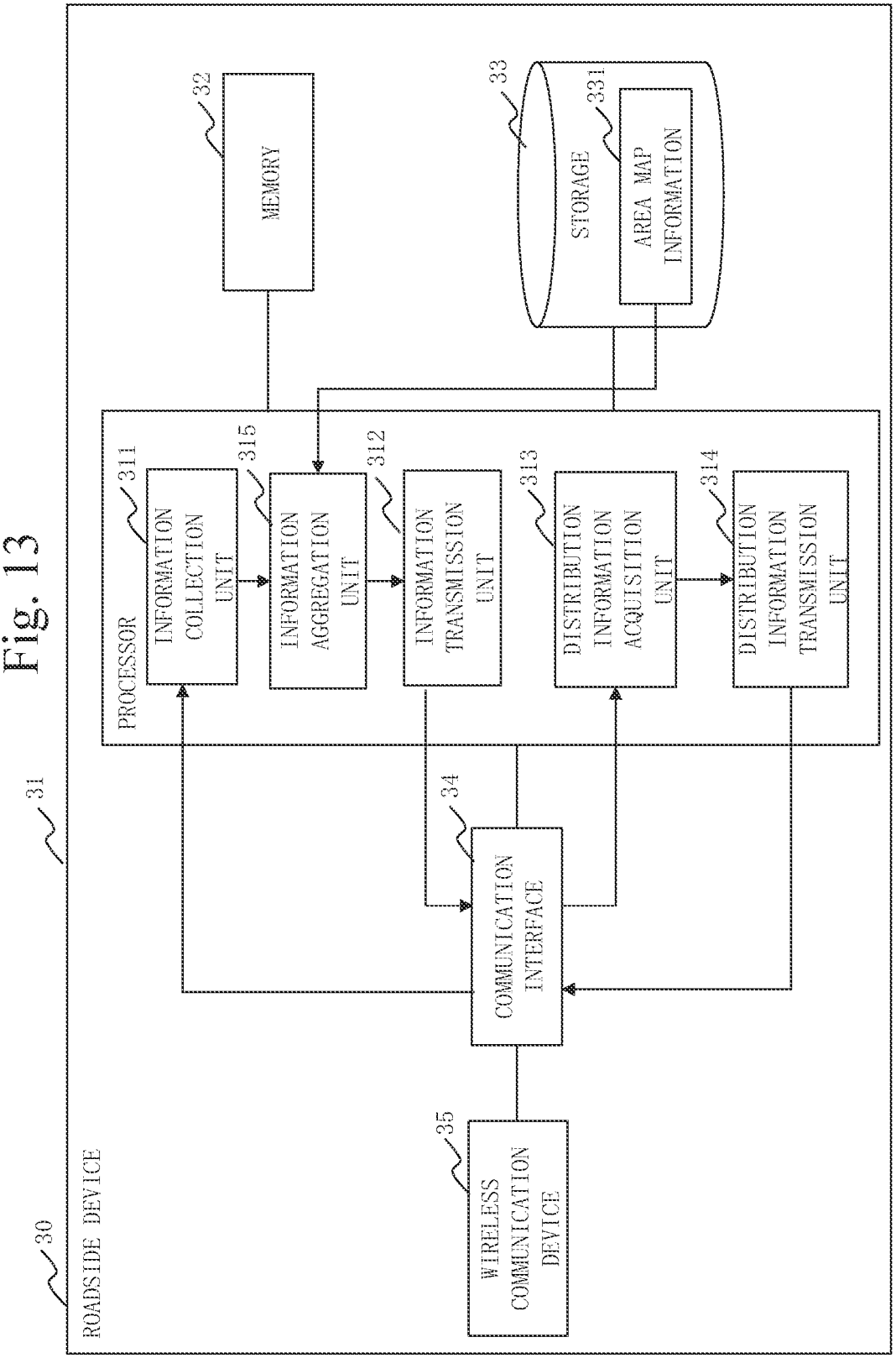
FIG. 13 is a configuration diagram of the roadside device 30 according to Embodiment 2.

A configuration of the roadside device 30 according to Embodiment 2 will be described with referring to FIG. 13.

Figure 4:
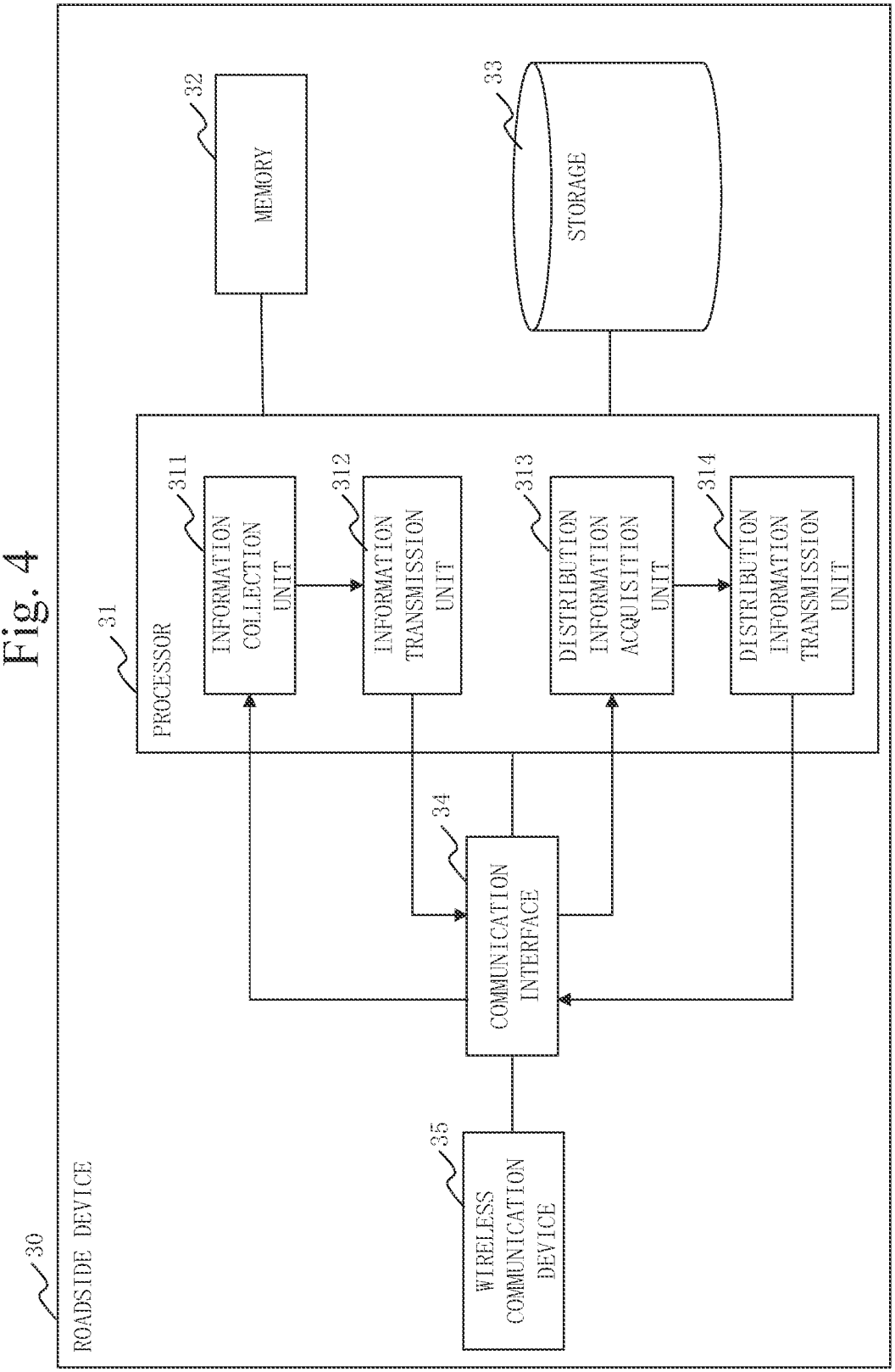
FIG. 4 is a configuration diagram of a roadside device 30 according to Embodiment 1.

The roadside device 30 differs from the roadside device 30 illustrated in FIG. 4 in that the roadside device 30 includes an information aggregation unit 315 as a functional component. A function of the information aggregation unit 315 is implemented by software or hardware just as other functional components.

Further, the roadside device 30 differs from the roadside device 30 illustrated in FIG. 4 in that the roadside device 30 stores area map information 331 in the storage 13. The area map information 331 is map information indicating a map of the surroundings of the roadside device 30 in the subjected area.

\*\*\*Description of Operation\*\*\*

Operation of the traffic management system 100 according to Embodiment 2 will be described with referring to FIG. 14.

Figure 6:
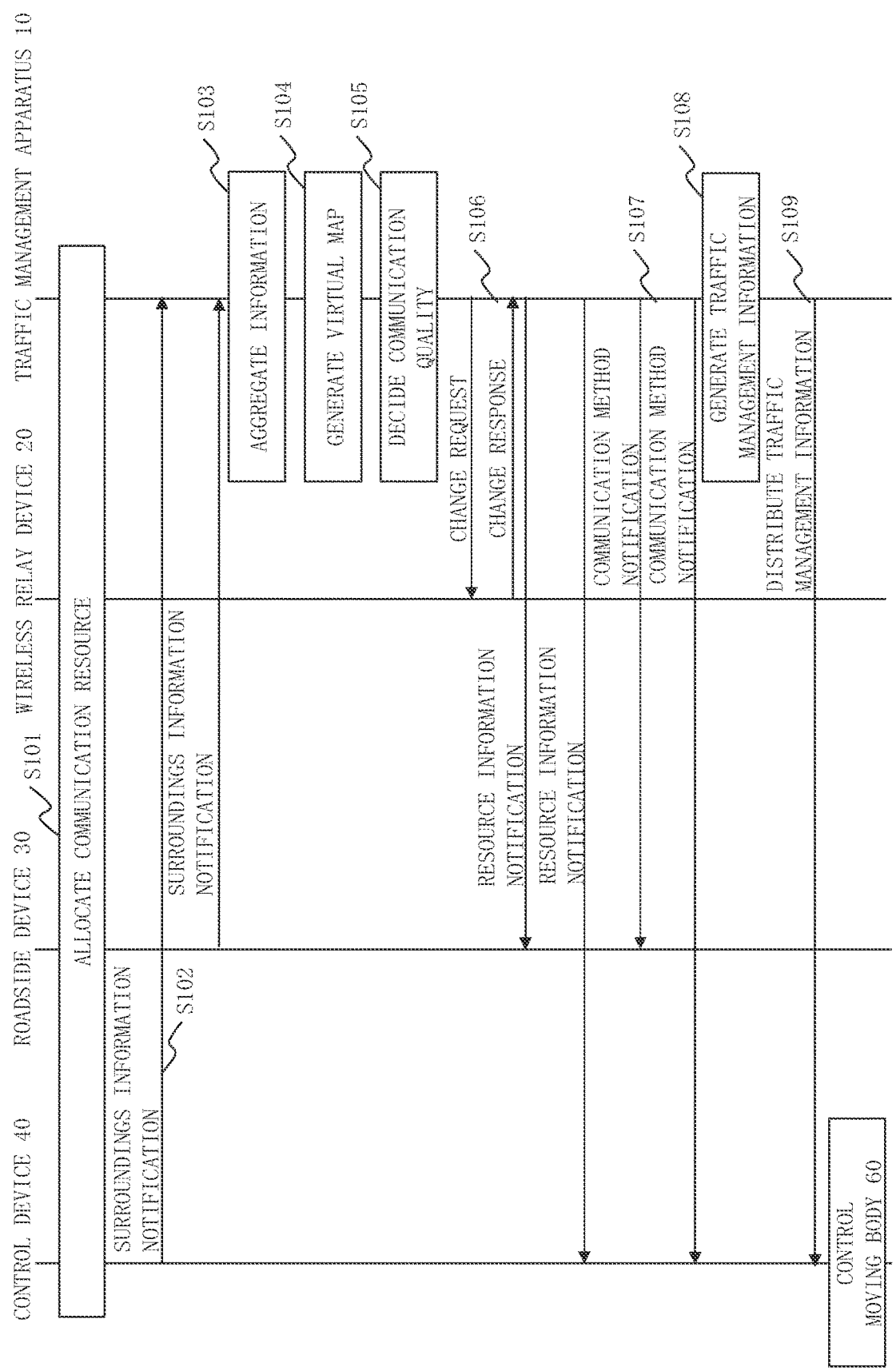
FIG. 6 is a processing flow diagram illustrating operation of the traffic management system 100 according to Embodiment 1.
Figure 14:
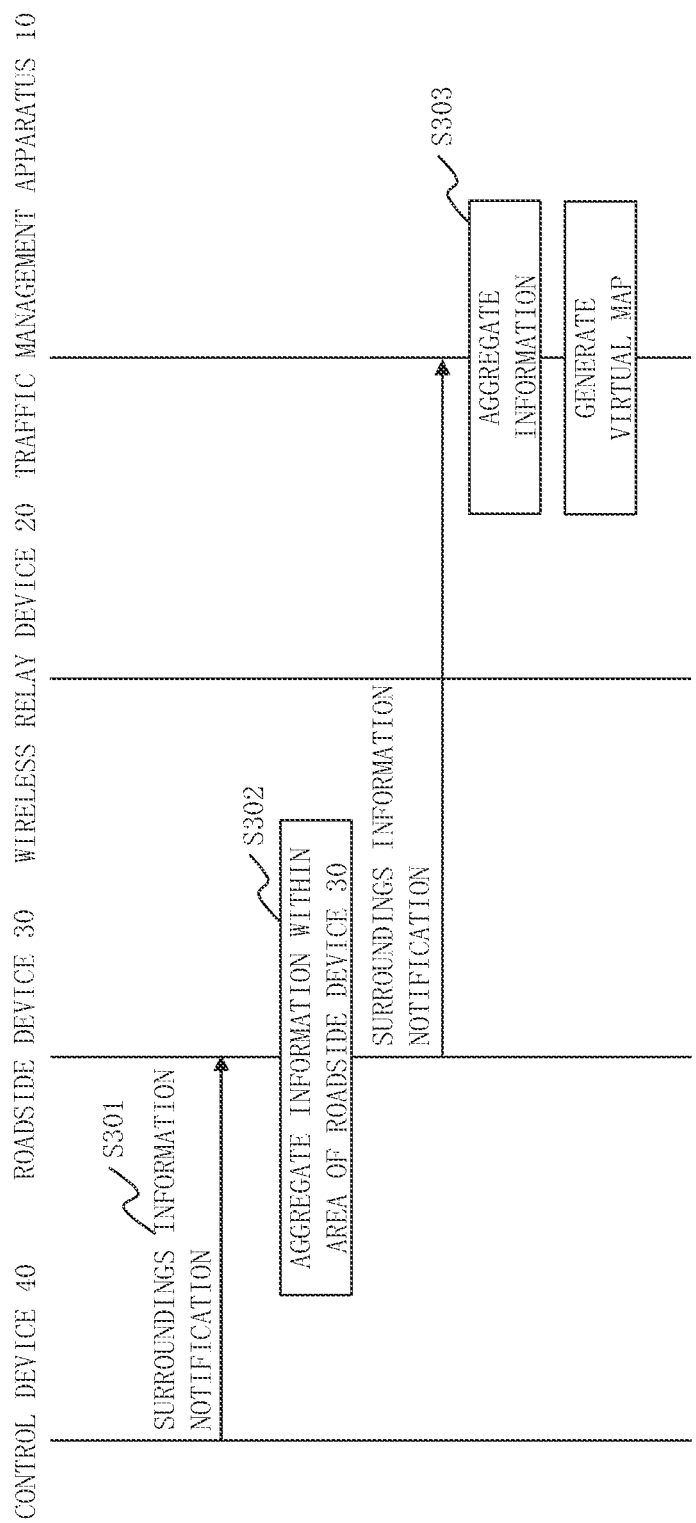
FIG. 14 is a processing flow diagram illustrating the operation of the traffic management system 100 according to Embodiment 2.

The processes illustrated in FIG. 14 are equivalent to the processes from step S102 to step S104 of FIG. 6.

(Step S301: Information Transmission Process)

The information collection unit 411 of the control device 40 collects sensor information acquired by sensing surroundings with using a camera and a sensor such as LiDAR installed in the moving body 60. Further, the information collection unit 411 acquires sensor information indicating a state of the moving body 60 of a vehicle such as a vehicle speed, a steering angle, and an acceleration speed of the moving body 60, with using sensors such as a vehicle speed sensor and a steering angle sensor installed in the moving body 60. The information transmission unit 412 transmits to the roadside device 30, the sensor information via the communication interface 44. The roadside device 30 to which the sensor information is transmitted, is the roadside device 30 that includes the wireless communication device 35 that forms the communication area where the control device 40 is located.

(Step S302: Information Aggregation Process)

The information collection unit 311 of the roadside device 30 collects sensor information acquired by sensing surroundings with using an installed sensor. Further, the information collection unit 311 acquires from an external server that provides weather forecast service, weather information on the subjected area.

The information aggregation unit 315 analyzes the collected sensor information, the sensor information transmitted in step S301, and the weather information. Then, in the same way as step S103 of FIG. 6, the information aggregation unit 315 specifies types and positions of objects in the communication area of the wireless communication device 35 and specifies a road surface condition at each point in the subjected area.

The information transmission unit 312 transmits to the traffic management apparatus 10, the information specified by the information aggregation unit 315, as monitor information.

(Step S303: Virtual Map Generation Process)

The virtual map generation unit 112 of the traffic management apparatus 10 aggregates the monitor information transmitted by each roadside device 30 to generate the virtual map.

*Effect of Embodiment 2*

As described above, after collecting the sensor information from the control device 40 located in the communication area and aggregating the collected sensor information, the roadside device 30 according to Embodiment 2 transmits the aggregated sensor information to the traffic management apparatus 10. As a result, the amount of data to be transmitted to the traffic management apparatus 10 is reduced, so that it is possible to reduce the congestion of the communication network 50. Further, it is possible to reduce processing load on the traffic management apparatus 10.

Embodiment 3

Embodiment 3 differs from Embodiments 1 and 2 in that when there is an area where the sensor information is insufficient, the control device 40 is instructed to collect the sensor information in the area. In Embodiment 3, this difference will be described and a description of the same point will be omitted.

In Embodiment 3, a case where a function is added to Embodiment 1 will be described. However, it is possible to add the function to Embodiment 2.

*Description of Operation*

The operation of the traffic management system 100 according to Embodiment 3 will be described with referring to FIG. 15.

Figure 15:
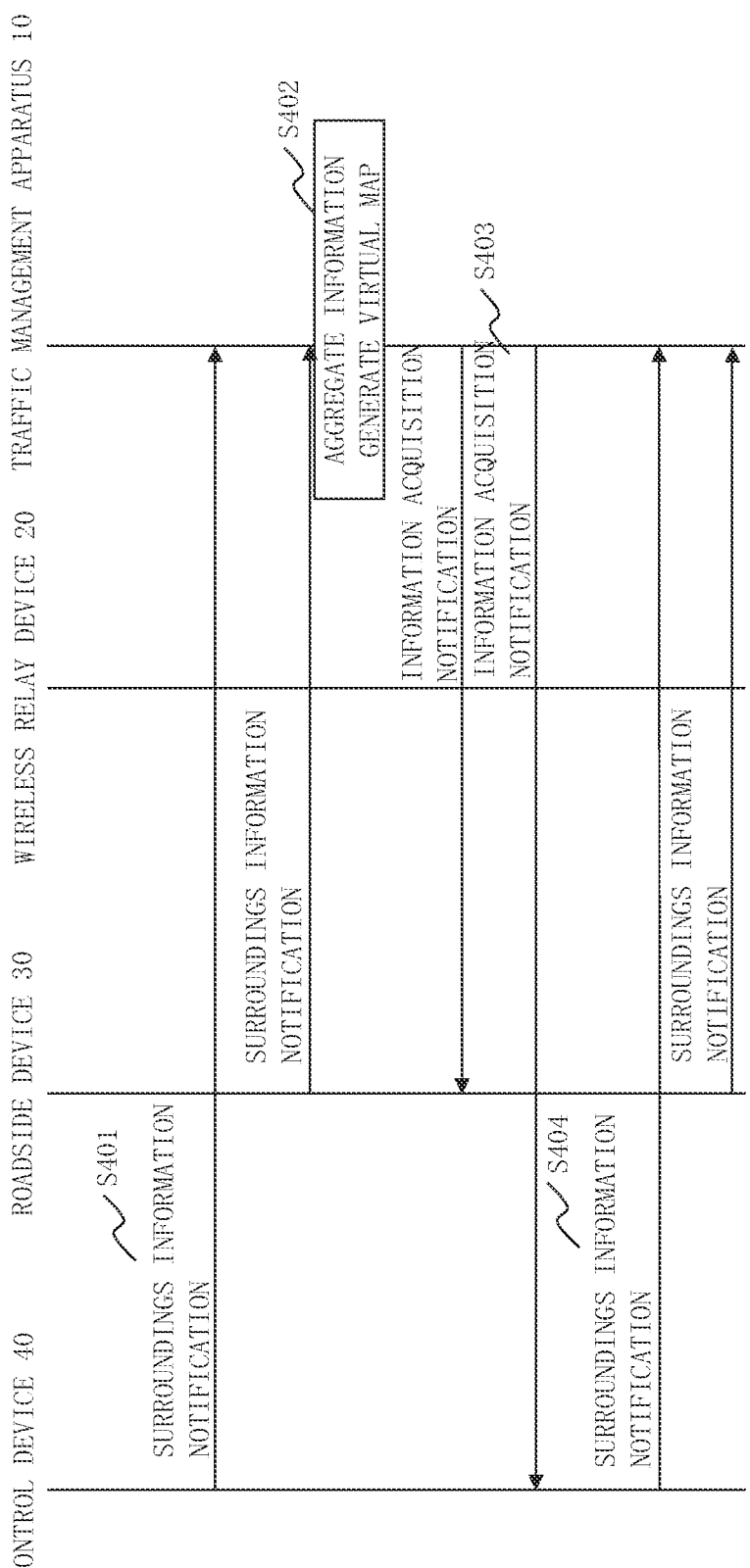
FIG. 15 is a processing flow diagram illustrating the operation of the traffic management system 100 according to Embodiment 3.

The processes illustrated in FIG. 15 are equivalent to the processes from step S102 to step S104 of FIG. 6.

(Step S401: Information Transmission Process)

In the same way as the process of step S102 of FIG. 6, the information collection unit 311 of the roadside device 30 and the information collection unit 411 of the control device 40 acquire sensor information, and the information transmission unit 312 and the information transmission unit 412 transmit the sensor information to the traffic management apparatus 10.

(Step S402: Virtual Map Generation Process)

In the same way as the process of step S103 of FIG. 6, the information acquisition unit 111 of the traffic management apparatus 10 acquires information and in the same way as step S104 of FIG. 6, the virtual map generation unit 112 generates a virtual map.

At this time, the virtual map generation unit 112 determines whether or not the sensor information is insufficient. Specifically, depending on image data which is the sensor information, there is a case where a type of an object or a road surface condition is not possible to be specified. Further, there is a case where there is no sensor information on a partial area. In such a case, the virtual map generation unit 112 determines that the sensor information is insufficient.

(Step S403: Information Acquisition Instruction Process)

When it is determined that the sensor information is insufficient, the information acquisition unit 111 of the traffic management apparatus 10 transmits an information acquisition notification to the roadside device 30 and the control device 40. The information acquisition notification indicates the necessary sensor information. For example, the information acquisition notification indicates an area where the sensor information is necessary and indicates necessary resolution.

At this time, the information acquisition unit 111 may transmit the information acquisition notification only to the control device 40 which is installed in the moving body 60 and located near the area where the sensor information is necessary. That is, when the sensor information on an area in the subjected area is insufficient, the information acquisition unit 111 may instruct the control device 40 installed in the moving body 60 travelling at a position corresponding to a position of the area, to collect the sensor information on the area.

Further, the information acquisition unit 111 may transmit the necessary sensor information only to the control device 40 installed in the moving body 60 that is able to acquire the necessary sensor information. For example, when the sensor information on a wide area is insufficient, the information acquisition unit 111 transmits the information acquisition notification to the control device 40 installed in a type of the moving body 60 that is able to collect the sensor information on a distant area. Further, when the detailed sensor information near the road surface is insufficient, the information acquisition unit 111 transmits the information acquisition notification to the control device 40 installed in the moving body 60 that is able to collect the detailed sensor information near the road surface. It is noted that the sensor information that can be collected by each moving body 60 is required to be specified in advance.

(Step S404: Information Retransmission Process)

The information collection unit 411 of the control device 40 that has received the information acquisition notification transmitted in step S403, collects the sensor information on the area indicated in the information acquisition notification. Then, the information transmission unit 412 transmits the sensor information to the traffic management apparatus 10.

After that, processing returns to step S402.

*Effect of Embodiment 3*

As described above, when there is an area where the sensor information is insufficient, the traffic management apparatus 10 according to Embodiment 3 instructs the control device 40 to collect the sensor information in the area. As a result, it is possible to generate a highly accurate virtual map. As a result, the area is efficiently used and safety of travelling is improved. Then, this leads to a solution to the insufficiency of wireless resources.

Embodiment 4

Embodiment 4 differs from Embodiments 1 to 3 in that a movement route of the moving body 60 is decided with using the virtual map. In Embodiment 4, this difference will be descried and a description of the same point will be omitted.

In Embodiment 4, a case where a function is added to Embodiment 1 will be described. However, it is possible to add the function to Embodiments 2 and 3.

\*\*\*Description of Configuration\*\*\*

Figure 16:
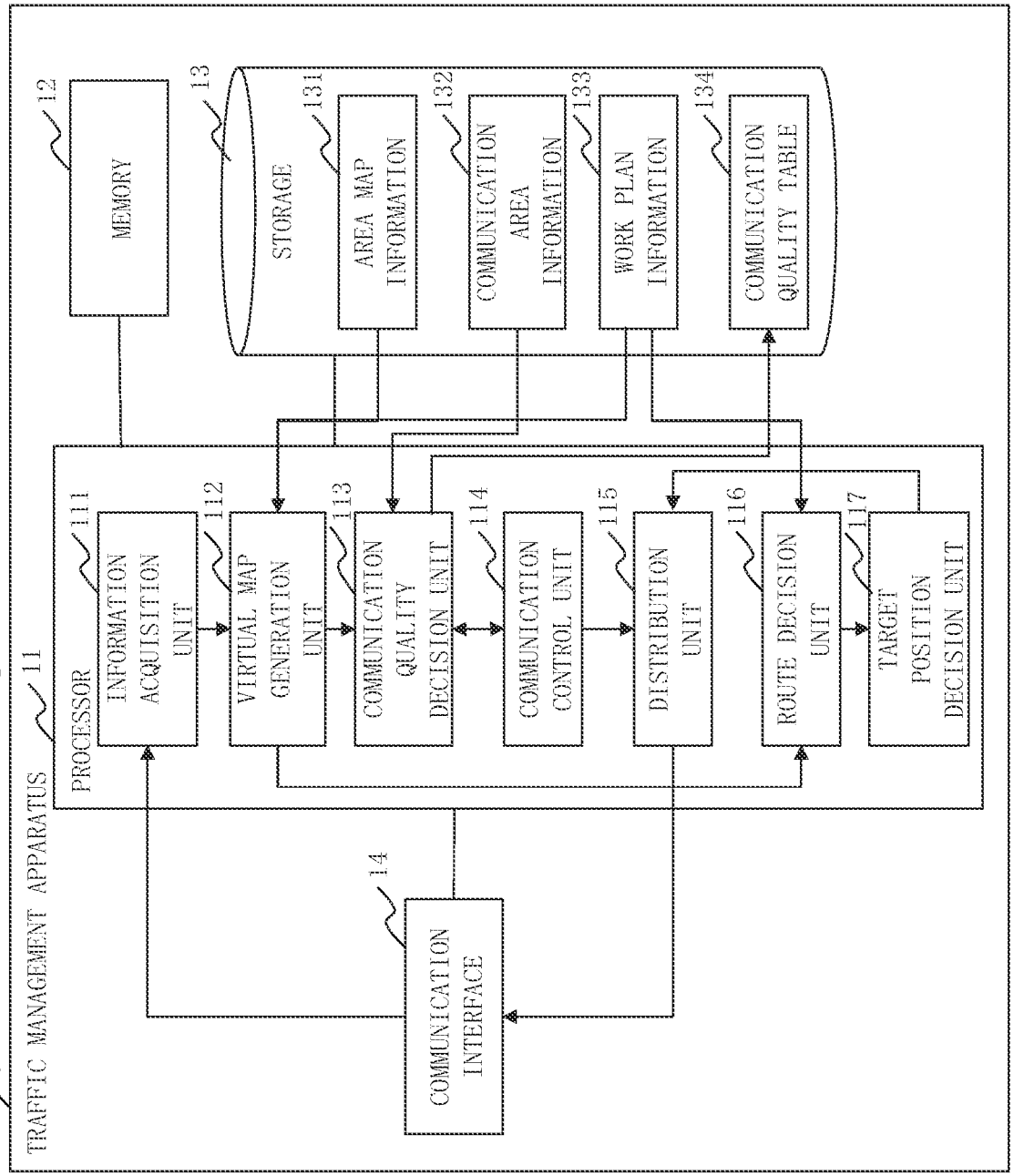
FIG. 16 is a configuration diagram of the traffic management apparatus 10 according to Embodiment 4.

A configuration of the traffic management apparatus 10 according to Embodiment 4 will be described with referring to FIG. 16.

Figure 2:
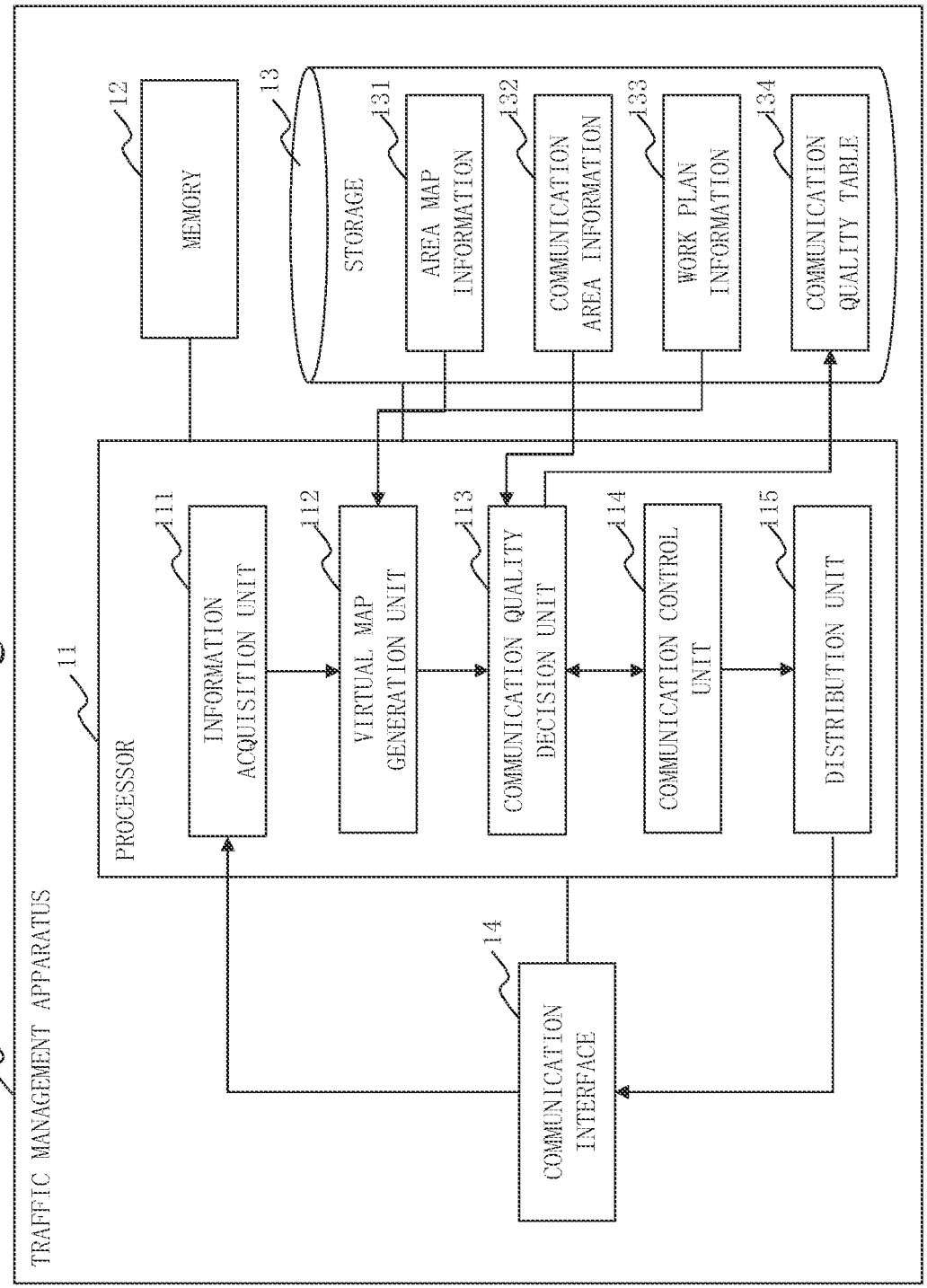
FIG. 2 is a configuration diagram of a traffic management apparatus 10 according to Embodiment 1.

The traffic management apparatus 10 differs from the traffic management apparatus 10 illustrated in FIG. 2 in that the traffic management apparatus 10 includes a route decision unit 116 and a target position decision unit 117, as functional components. Functions of the route decision unit 116 and the target position decision unit 117 are implemented by software or hardware just as other functional components.

\*\*\*Description of Operation\*\*\*

The operation of the traffic management system 100 according to Embodiment 4 will be described with referring to FIG. 17.

(Step S501: Route Decision Process)

The route decision unit 116 of the traffic management apparatus 10 decides based on the traffic management information and the work plan information 133, a movement route from a current position of the moving body 60 to a destination. The destination is a place or the like where a load to be transported by the moving body 60 is placed. For example, the purpose is specified by specifying from the work plan information 133, the load to be transported by the moving body 60, and specifying the destination where the load is placed.

At this time, the route decision unit 116 specifies, for example, the movement route so as to minimize a time required from picking up all loads to drop off all the loads. The route decision unit 116 is able to decide the movement route by solving a planning problem with constraints such as the number of moving bodies 60 that transport loads and the number of loads that can be carried by the moving body 60. A known method may be used as an optimization technique.

Alternatively, a route may be planned with using the following constraints. Constraint condition 1: priority is given to securing a travel route and the route is generated in which loads are loaded from a load on the side of front. Constraint condition 2: an order of loading on a truck is considered and priority is given to a load with heavy weight or priority is given to a frozen item. Constraint condition 3: in an automobile factory, priority is given for picking up a completed vehicle during a time slot for picking up, and priority is given for transporting the completed vehicle to a standby area during a time slot for transportation.

(Step S502: Target Position Decision Process)

The target position decision unit 117 of the traffic management apparatus 10 decides based on the movement route decided in step S501, a target position indicating a position at which the moving body 60 is supposed to travel at a subjected time point. At this time, the target position decision unit 117 decides the target position so as not to collide with other moving bodies 60 or the like existing in the subjected area. The subjected time point is decided depending on a period of distributing information to the control device 40. For example, the subjected time point is a time point at which the information is distributed two times later. As a result, each period and the target position at the time point when the next information is distributed, are distributed.

(Step S503: Communication Quality Decision Process)

The communication quality decision unit 113 of the traffic management apparatus 10 decides based on the target position decided in step S502, the communication resource to be allocated to the control device 40. Specifically, the communication quality decision unit 113 decides that the communication resource allocated to the communication area that includes the target position, is allocated to the control device 40.

When the number of control devices 40 that are in the communication area exceeds the number of control devices 40 that are able to maintain the communication quality, processing returns to step S501 and the communication quality decision unit 113 may redecide the movement route in consideration of target positions of other moving bodies 60. Further, the communication quality decision unit 113 returns the processing to step S502, so that the target position may be changed to cause the moving body 60 to stand by for a certain period time.

(Step S504: Distribution Process)

The distribution unit 115 of the traffic management apparatus 10 distributes the target position decided in step S502, to the control device 40 installed in the moving body 60.

The distribution information acquisition unit 413 of the control device 40 acquires the traffic management information. Then, the integration control unit 414 of the control device 40 controls the moving body 60, based on the sensor information collected by the sensors installed in the moving body 60, to move the moving body 60 to the target position. As a result, the moving body 60 moves so as to trace the movement route decided in step S501.

When an obstacle is detected on the route to the target position, the control device 40 avoids the obstacle, for example, by inquiring to the traffic management apparatus 10, or the like.

\*\*\*Effect of Embodiment 4\*\*\*

As described above, the traffic management apparatus 10 according to Embodiment 4 decides a movement route of the moving body 60 and distributes to the control device 40, a target position on the movement route at the subjected time point. As a result, it is possible to appropriately move the moving body 60. Further, the traffic management apparatus 10 decides the position of the moving body 60, so that it is possible to avoid a situation where the moving bodies 60 are gathered in one place. Therefore, it is possible to avoid tightness of a communication band.

\*\*\*Other Configurations\*\*\*

<Modification 4>

In Embodiment 4, the traffic management apparatus 10 specifies the destination and decides the movement route to the destination and the target position. However, the roadside device 30 may decide the target position. It is possible to reduce load on the traffic management apparatus 10 by dispersing processing instead of concentrating the processing on the traffic management apparatus 10.

Figure 18:
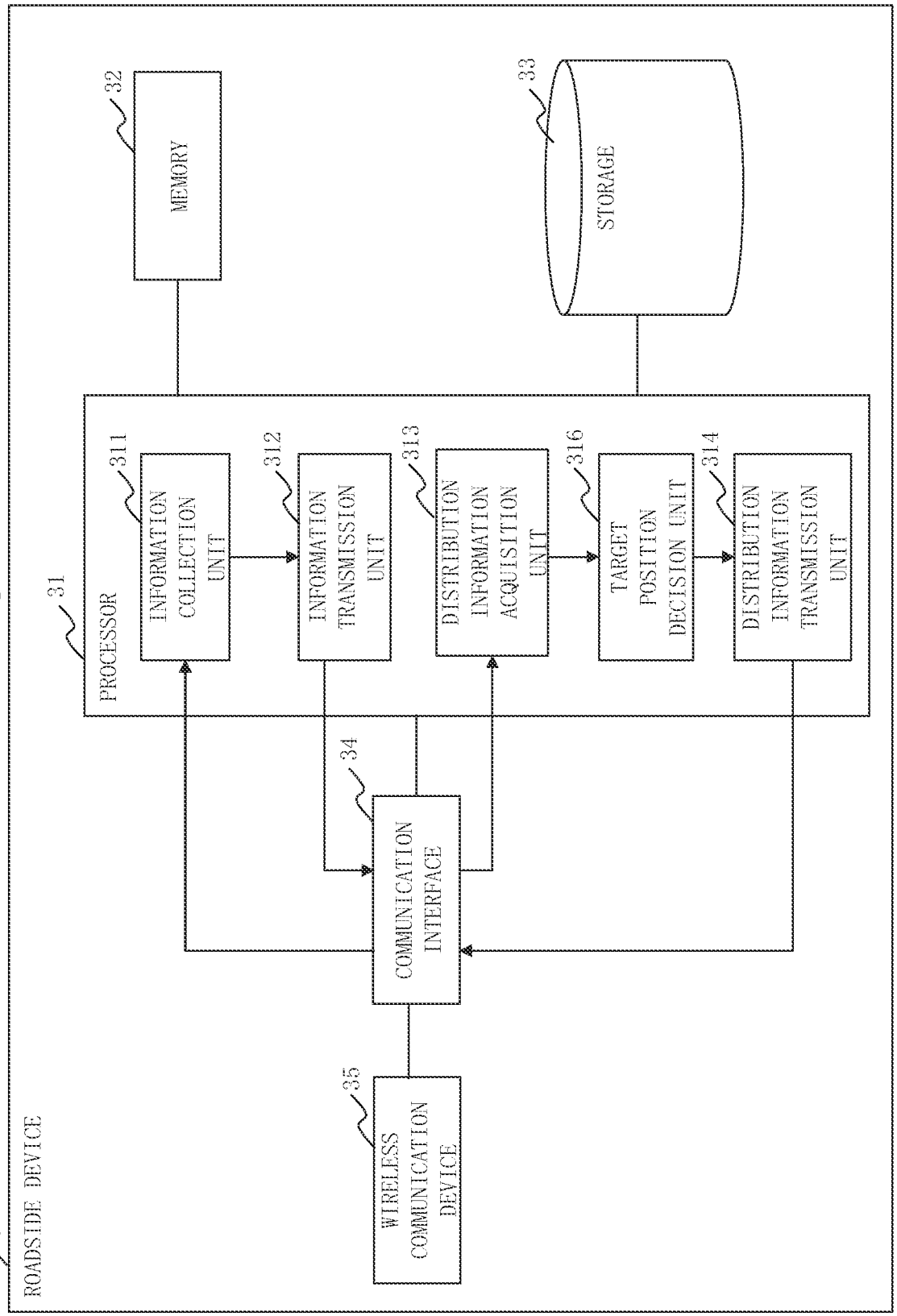
FIG. 18 is a configuration diagram of the roadside device 30 according to Modification 4.

A configuration of the roadside device 30 according to Modification 4 will be described with referring to FIG. 18.

The roadside device 30 differs from the roadside device 30 illustrated in FIG. 4 in that the roadside device 30 includes a target position decision unit 316 as a functional component. A function of the target position decision unit 316 is implemented by software or hardware just as other functional components.

Figure 19:
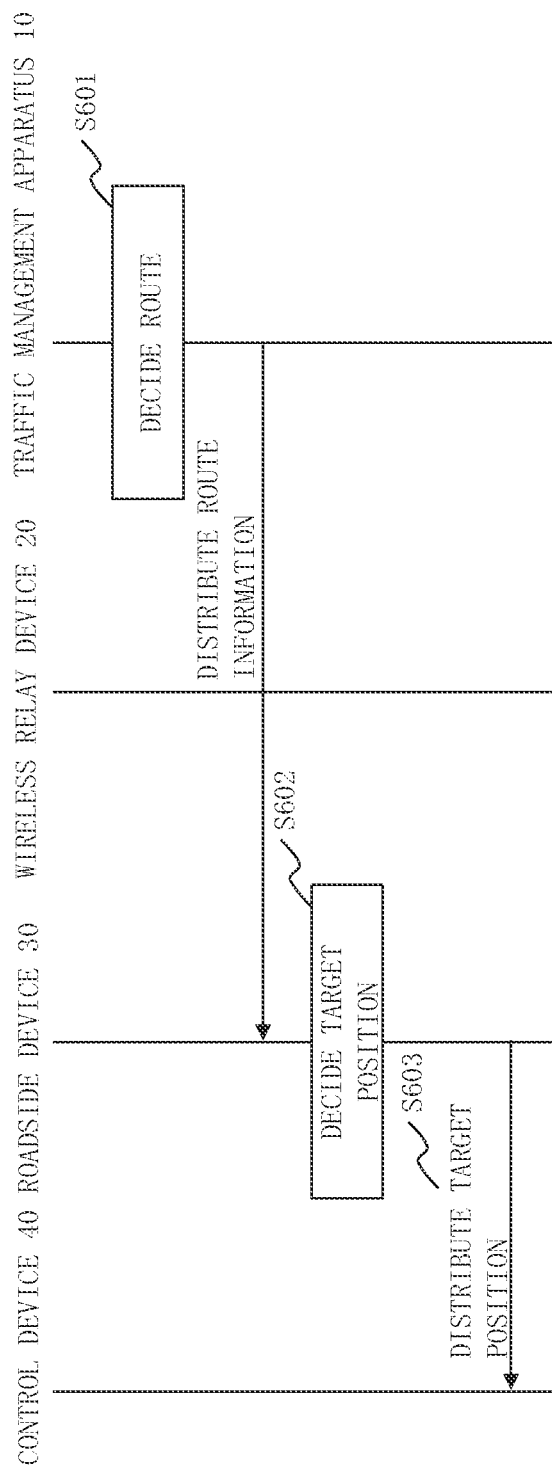
FIG. 19 is a processing flow diagram illustrating the operation of the traffic management system 100 according to Modification 4.

The operation of the traffic management system 100 according to Modification 4 will be described with referring to FIG. 19.

(Step S601: Destination Specification Process)

Figure 17:
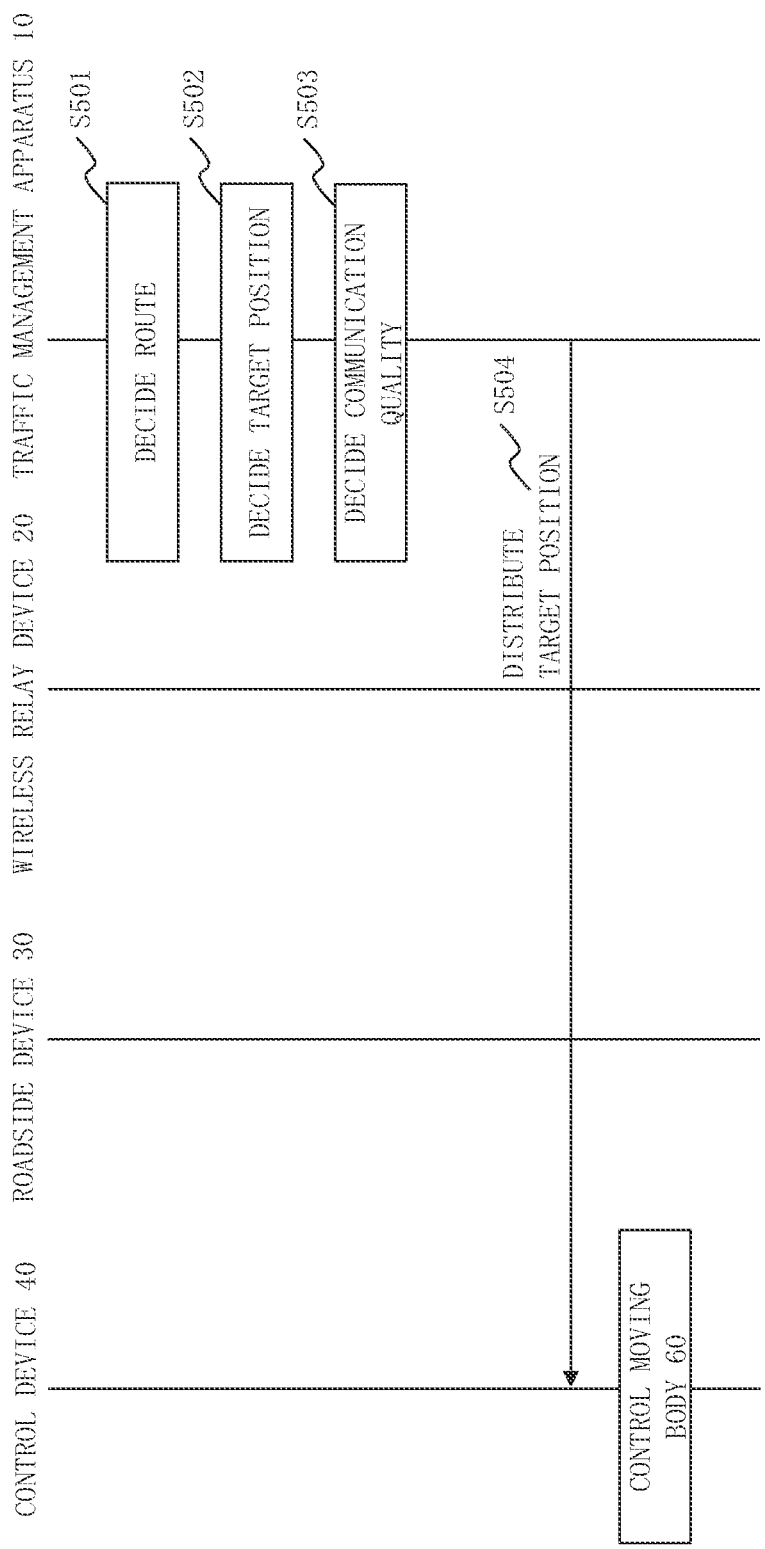
FIG. 17 is a processing flow diagram illustrating the operation of the traffic management system 100 according to Embodiment 4.

In the same way as step S501 of FIG. 17, the route decision unit 116 of the traffic management apparatus 10 decides based on the traffic management information and the work plan information 133, a movement route from a current position of the moving body 60 to a destination. The route decision unit 116 transmits to the roadside device 30, route information indicating the work plan information 133 and the movement route.

(Step S602: Target Position Decision Process)

In the same way as step S502 of FIG. 17, the target position decision unit 316 of the roadside device 30 decides a target position. The target position decision unit 316 notifies the traffic management apparatus 10 of the target position and causes the traffic management apparatus 10 to execute allocation of the communication resource in the same way as step S503 of FIG. 17.

(Step S603: Distribution Process)

The distribution information transmission unit 314 of the roadside device 30 distributes the target position decided in step S602 to the control device 40 installed in the moving body 60.

Embodiment 5

Embodiment 5 differs from Embodiments 1 to 4 in that the subjected area is divided into meshed areas to simplify management of the virtual map. In Embodiment 5, this difference will be described and a description of the same point will be omitted.

In Embodiment 5, a case where Embodiment 1 is modified will be described. However, it is possible to modify Embodiments 2 to 4.

*Description of Operation*

The operation of the traffic management system 100 according to Embodiment 5 will be described with referring to FIG. 20.

As a preliminary preparation for processing illustrated in FIG. 20, a plurality of divided areas is defined where the subjected area is divided into meshed areas. Here, it is desirable that a size of the divided area is a size of the smallest moving body 60. Then, the communication area information 132 is updated to information in which the divided areas are superimposed on each communication area.

The process of step S701 is equivalent to the processes from step S102 to step S103 of FIG. 6.

(Step S702: Virtual Map Generation Process)

The virtual map generation unit 112 of the traffic management apparatus 10 generates a virtual map in the same way as the process of step S104 of FIG. 6. However, the virtual map generation unit 112 sets the role area for each divided area. That is, one divided area is not divided into a plurality of role areas, but one divided area is set to one role area.

The process of step S703 is equivalent to the processes from step S105 to step S108 of FIG. 6.

(Step S704: Distribution Process)

The distribution unit 115 of the traffic management apparatus 10 distributes the traffic management information to the control device 40.

The distribution information acquisition unit 413 of the control device 40 acquires the traffic management information. Then, the integration control unit 414 of the control device 40 decides based on the traffic management information, a movement target of the moving body 60 at each time point, and controls the moving body 60 based on the sensor information collected by the sensors installed in the moving body 60, to move the moving body 60 to the movement target.

As described in Embodiment 4, when the target position is distributed to the control device 40, the divided area may be set as the target position. That is, the target position is not specified by a coordinate value or the like, but it is possible to specify the target position by identification information on the divided area. Then, the moving bodies 60 are controlled, so that there is one moving body 60 that sets each divided area as the target position. Therefore, it is possible to reduce probability of collision between the moving bodies 60.

*Effect of Embodiment 5*

As described above, the traffic management apparatus 10 according to Embodiment 5 divides the subjected area into meshed areas. As a result, it is possible to reduce the amount of information to be communicated. Further, it is possible to reduce processing load such as virtual map generation and target position decision.

Incidentally, "unit" in the above description may be read as "circuit", "step", "procedure", "process", or "processing circuitry".

The embodiments and modifications of the present disclosure have been described above. Two or more of these embodiments and modifications may be implemented in combination. Alternatively, one or more of them may be partially implemented. The present disclosure is not limited to the above embodiments and modifications, and various modifications can be made as needed.

REFERENCE SIGNS LIST

100: traffic management system; 10: traffic management apparatus; 11: processor; 12: memory; 13: storage; 14: communication interface; 111: information acquisition unit; 112: virtual map generation unit; 113: communication quality decision unit; 114: communication control unit; 115: distribution unit; 116: route decision unit; 117: target position decision unit; 131: area map information; 132: communication area information; 133: work plan information; 134: communication quality table; 20: wireless relay device; 21: processor; 22: memory; 23: storage; 24: communication interface; 211: communication quality adjustment unit; 30: roadside device; 31: processor; 32: memory; 33: storage; 34: communication interface; 35: wireless communication device; 311: information collection unit; 312: information transmission unit; 313: distribution information acquisition unit; 314: distribution information transmission unit; 315: information aggregation unit; 316: target position decision unit; 331: area map information; 40: control device; 41: processor; 42: memory; 43: storage; 44: communication interface; 411: information collection unit; 412: information transmission unit; 413: distribution information acquisition unit; 414: integration control unit; 50: communication network; 60: moving body; 71: gate; 72: arrangement position of loads; 73: load area; 74: standby area; 75: travel area

The invention claimed is:

1. A traffic management apparatus comprising:
processing circuitry to:
generate a virtual map of a subjected area by dividing an area in which a moving body is able to travel in the subjected area, into role areas each of which corresponds to each of a plurality of roles and includes a travel area which is used for the moving body to travel and other areas which are not used for the moving body to travel, based on the number of moving bodies scheduled to travel in the subjected area specified from work plan information which is work plan information regarding the subjected area of the moving body and is plan information on a transportation work of loads by the moving body, and based on the number of loads scheduled to be placed in the subjected area specified from the work plan information; and distribute to the moving body, the generated virtual map.

2. The traffic management apparatus according to claim 1, wherein the processing circuitry generates the virtual map by dividing the subjected area in consideration of at least one of a weather condition and a surface road condition.

3. The traffic management apparatus according to claim 1, wherein the other areas include a load area for the loads to be placed and a standby area for the moving body to load or unload the loads in the subjected area.

4. The traffic management apparatus according to claim 1, wherein the processing circuitry generates the virtual map in consideration of the number of loads and positions of the loads that have been already placed in the subjected area.

5. The traffic management apparatus according to claim 4, wherein the processing circuitry acquires sensor information collected by a sensor installed in the moving body travelling in the subjected area, and the processing circuitry specifies from the acquired sensor information, the number of loads and the positions of the loads that have been already placed in the subjected area.

6. The traffic management apparatus according to claim 4, wherein the processing circuitry acquires monitor information that has been specified from the sensor information acquired from the moving body that travels in a partial area, which is a part of the subjected area, and that indicates the number of loads and the position of the loads that have been already placed in the subjected area, and the processing circuitry specifies based on the acquired monitor information, the number of loads that have been already placed in the subjected area.

7. The traffic management apparatus according to claim 5, wherein when the sensor information on an area in the subjected area is insufficient, the processing circuitry instructs the moving body travelling at a position corresponding to a position of the area, to collect the sensor information on the area.

8. The traffic management apparatus according to claim 1, wherein the processing circuitry decides for each of one or more communication areas in the subjected area, a communication resource that can be used by a device in the communication area, depending on a ratio of each role area included in the communication area.

9. The traffic management apparatus according to claim 8, wherein the processing circuitry notifies the device of a communication method, depending on the communication resource that has been decided and that can be used by the device.

10. The traffic management apparatus according to claim 1, wherein the processing circuitry decides based on the work plan information and the virtual map, a target position that indicates a position at which the moving body is supposed to travel at a subjected time point, and the processing circuitry distributes to the moving body, the decided target position.

11. The traffic management apparatus according to claim 1, wherein the processing circuitry generates the virtual map by deciding which of the plurality of roles is corresponded to each of a plurality of divided areas where the subjected area is divided into meshed areas and then dividing the subjected area into the plurality of role areas.

12. A traffic management method comprising:

generating a virtual map of a subjected area by dividing an area in which a moving body is able to travel in the subjected area, into role areas each of which corresponds to each of a plurality of roles and includes a travel area which is used for the moving body to travel and other areas which are not used for the moving body to travel, based on the number of moving bodies scheduled to travel in the subjected area specified from work plan information which is work plan information regarding the subjected area of the moving body and is plan information on a transportation work of loads by the moving body, and based on the number of loads scheduled to be placed in the subjected area specified from the work plan information; and distributing the virtual map to the moving body.

13. A non-transitory computer readable medium storing a traffic management program for causing a computer to function as a traffic management apparatus that executes:

a virtual map generation process to generate a virtual map of a subjected area by dividing an area in which a moving body is able to travel in the subjected area, into role areas each of which corresponds to each of a plurality of roles and includes a travel area which is used for the moving body to travel and other areas which are not used for the moving body to travel, based on the number of moving bodies scheduled to travel in the subjected area specified from work plan information which is work plan information regarding the subjected area of the moving body and is plan information on a transportation work of loads by the moving body, and based on the number of loads scheduled to be placed in the subjected area specified from the work plan information; and a distribution process to distribute to the moving body, the virtual map generated by the virtual map generation process.

* * * * *